United States Patent
Sun et al.

(10) Patent No.: US 10,492,220 B2
(45) Date of Patent: Nov. 26, 2019

(54) OPPORTUNISTIC EXTENDED CHANNEL UPLINK GRANTS FOR ECC

(71) Applicant: QUALCOMM Incorporated, San Diego, CA (US)

(72) Inventors: Jing Sun, San Diego, CA (US); Tao Luo, San Diego, CA (US); Taesang Yoo, Riverside, CA (US); Siddhartha Mallik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 15/215,422

(22) Filed: Jul. 20, 2016

(65) Prior Publication Data
US 2017/0094683 A1  Mar. 30, 2017

Related U.S. Application Data

(60) Provisional application No. 62/235,350, filed on Sep. 30, 2015.

(51) Int. Cl.
*H04W 74/04* (2009.01)
*H04W 72/04* (2009.01)
(Continued)

(52) U.S. Cl.
CPC .............. *H04W 74/04* (2013.01); *H04L 5/00* (2013.01); *H04L 27/00* (2013.01);
(Continued)

(58) Field of Classification Search
CPC .......... H04L 27/0006; H04W 72/0413; H04W 72/14; H04W 72/1231; H04W 74/04
See application file for complete search history.

(56) References Cited

U.S. PATENT DOCUMENTS 8,275,323 B1 * 9/2012 Shirali ................. H04W 72/04
                                                     455/67.11
8,363,578 B1 * 1/2013 Ramamurthy ........ H04W 72/02
                                                        370/310
(Continued)

FOREIGN PATENT DOCUMENTS

WO   WO-2012101481 A1   8/2012

OTHER PUBLICATIONS

ISA/EP, International Search Report and Written Opinion of the International Searching Authority, Int'l Application No. PCT/US2016/050216, dated Nov. 11, 2016, European Patent Office, Rijswijk, NL, 9 pgs.

*Primary Examiner* — Redentor Pasia
(74) *Attorney, Agent, or Firm* — Holland & Hart LLP

(57) ABSTRACT

Methods, systems, and devices for wireless communication are described. A wireless communication system may utilize a listen before talk (LBT) procedure prior to transmission. A base station may perform an enhanced clear channel assessment (eCCA) on one channel and a single clear channel assessment (CCA) on another channel. The base station may then send a grant for a user equipment (UE) to transmit on both channels. The UE may receive the grant, and perform a single CCA on the first channel and an eCCA on the second channel. The UE may then transmit uplink information on both the first channel and the second channel. That is, the base station may send an opportunistic grant for transmitting on the second channel even though it may not have passed eCCA at the base station. The UE may then use the channel if it passes an eCCA.

16 Claims, 19 Drawing Sheets

(51) Int. Cl.
  *H04W 72/14* (2009.01)
  *H04W 74/08* (2009.01)
  *H04L 27/00* (2006.01)
  *H04L 5/00* (2006.01)
  *H04W 72/12* (2009.01)

(52) U.S. Cl.
  CPC ..... *H04L 27/0006* (2013.01); *H04W 72/0413* (2013.01); *H04W 72/1231* (2013.01); *H04W 72/14* (2013.01); *H04W 74/0808* (2013.01); *H04L 5/001* (2013.01)

(56) References Cited

U.S. PATENT DOCUMENTS

| | | | |
|---|---|---|---|
| 2009/0238121 A1* | 9/2009 | Kotecha | H04L 1/0026 370/329 |
| 2012/0188963 A1* | 7/2012 | Iwamura | H04W 72/1263 370/329 |
| 2014/0254510 A1* | 9/2014 | Porat | H04W 72/0493 370/329 |
| 2014/0362780 A1 | 12/2014 | Malladi et al. | |
| 2015/0172950 A1 | 6/2015 | Chen et al. | |
| 2016/0198358 A1* | 7/2016 | Rong | H04W 72/1268 370/235 |
| 2016/0226629 A1* | 8/2016 | Liu | H04L 1/1861 |
| 2016/0309511 A1* | 10/2016 | Li | H04W 74/0808 |
| 2016/0366701 A1* | 12/2016 | Chu | H04W 74/0816 |

* cited by examiner

OPPORTUNISTIC EXTENDED CHANNEL UPLINK GRANTS FOR ECC

CROSS REFERENCES

The present application for patent claims priority to U.S. Provisional Patent Application No. 62/235,350 by SUN et al., entitled "OPPORTUNISTIC EXTENDED CHANNEL UPLINK GRANTS FOR ECC," filed Sep. 30, 2015, assigned to the assignee hereof.

BACKGROUND

The following relates generally to wireless communication, and more specifically to opportunistic extended channel uplink grants for ECC.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

In contention based wireless communication systems, a listen before talk (LBT) procedure may be performed prior to transmission. For example, a device may perform one or more clear channel assessments (CCAs) on a channel by detecting a threshold energy level. In some cases, a transmitter may perform an extended CCA (eCCA) that includes multiple CCA measurements. In some networks, a base station may perform the eCCA to determine availability of a channel for uplink transmission by a user equipment (UE). That is, the base station may attempt eCCA on each channel, and send a grant for those channels that are available. However, this process may result in occasions where the UE is unable to transmit uplink data because the eCCA fails at the base station. This may delay transmissions or reduce the effective bandwidth of a channel.

SUMMARY

A wireless communication system may utilize a listen before talk (LBT) procedure prior to transmission. A base station may perform an enhanced clear channel assessment (eCCA) on one channel and a single clear channel assessment (CCA) on another channel. The base station may then send a grant for a user equipment (UE) to transmit on both channels. The UE may receive the grant, and perform a single CCA on the first channel and an eCCA on the second channel. The UE may then transmit uplink information on both the first channel and the second channel. That is, the base station may send an opportunistic grant for transmitting on the second channel even though it may not have passed eCCA at the base station. The UE may then use the channel if it passes an eCCA.

A method of wireless communication is described. The method may include receiving a scheduling message on a first channel, the scheduling message identifying the first channel and a second channel, performing a first channel clearance procedure on the first channel based at least in part on receiving the scheduling message on the first channel and performing a second channel clearance procedure on the second channel based at least in part on determining that the scheduling message has not been received on the second channel.

An apparatus for wireless communication is described. The apparatus may include means for receiving a scheduling message on a first channel, the scheduling message identifying the first channel and a second channel, means for performing a first channel clearance procedure on the first channel based at least in part on receiving the scheduling message on the first channel and means for performing a second channel clearance procedure on the second channel based at least in part on determining that the scheduling message has not been received on the second channel.

A further apparatus is described. The apparatus may include a processor, memory in electronic communication with the processor, and instructions stored in the memory. The instructions may be operable to cause the processor to receive a scheduling message on a first channel, the scheduling message identifying the first channel and a second channel, perform a first channel clearance procedure on the first channel based at least in part on receiving the scheduling message on the first channel and perform a second channel clearance procedure on the second channel based at least in part on determining that the scheduling message has not been received on the second channel.

A non-transitory computer readable medium for wireless communication is described. The non-transitory computer-readable medium may include instructions to cause a processor to receive a scheduling message on a first channel, the scheduling message identifying the first channel and a second channel, perform a first channel clearance procedure on the first channel based on receiving the scheduling message on the first channel and perform a second channel clearance procedure on the second channel based on determining that the scheduling message has not been received on the second channel.

In some examples of the method, apparatus, or non-transitory computer-readable medium described above, performing the first channel clearance procedure comprises: performing a single clear channel assessment (CCA) check, and performing an extended CCA (eCCA) check if the single CCA check is unsuccessful.

In some examples of the method, apparatus, or non-transitory computer-readable medium described above, performing the single CCA check comprises: determining whether the first channel is clear based on a single CCA.

Some examples of the method, apparatus, or non-transitory computer-readable medium described above may further include processes, features, means, or instructions for transmitting uplink (UL) data on the first channel based on the first channel clearance procedure.

In some examples of the method, apparatus, or non-transitory computer-readable medium described above, performing the second channel clearance procedure comprises: performing an eCCA check. In some examples of the method, apparatus, or non-transitory computer-readable medium described above, performing the second channel clearance procedure comprises: determining that a single CCA check is not sufficient to gain access to the second channel.

Some examples of the method, apparatus, or non-transitory computer-readable medium described above may further include processes, features, means, or instructions for transmitting UL data on the second channel based on the second channel clearance procedure, where the transmitted UL data comprises an indication of whether the first channel, the second channel or both are being used.

In some examples of the method, apparatus, or non-transitory computer-readable medium described above, the scheduling message comprises a first UL grant for the first channel and a second UL grant for the second channel. In some examples of the method, apparatus, or non-transitory computer-readable medium described above, a first modulation and coding scheme (MCS) of the first UL grant is different from a second MCS of the second UL grant.

A method of wireless communication is described. The method may include determining that a first eCCA check on a first channel is successful and that a second eCCA check on a second channel is unsuccessful and transmitting a scheduling message on the first channel based on the determination, the scheduling message identifying the first channel and the second channel.

An apparatus for wireless communication is described. The apparatus may include means for determining that a first eCCA check on a first channel is successful and that a second eCCA check on a second channel is unsuccessful and means for transmitting a scheduling message on the first channel based on the determination, the scheduling message identifying the first channel and the second channel.

A further apparatus is described. The apparatus may include a processor, memory in electronic communication with the processor, and instructions stored in the memory. The instructions may be operable to cause the processor to determine that a first eCCA check on a first channel is successful and that a second eCCA check on a second channel is unsuccessful and transmit a scheduling message on the first channel based on the determination, the scheduling message identifying the first channel and the second channel.

A non-transitory computer readable medium for wireless communication is described. The non-transitory computer-readable medium may include instructions to cause a processor to determine that a first eCCA check on a first channel is successful and that a second eCCA check on a second channel is unsuccessful and transmit a scheduling message on the first channel based on the determination, the scheduling message identifying the first channel and the second channel.

Some examples of the method, apparatus, or non-transitory computer-readable medium described above may further include processes, features, means, or instructions for refraining from transmitting the scheduling message on the second channel based on the second eCCA check.

Some examples of the method, apparatus, or non-transitory computer-readable medium described above may further include processes, features, means, or instructions for identifying whether UL data is being transmitted on the first channel or the second channel or both. Some examples of the method, apparatus, or non-transitory computer-readable medium described above may further include processes, features, means, or instructions for receiving the UL data on the first channel or the second channel based on the scheduling message.

In some examples of the method, apparatus, or non-transitory computer-readable medium described above, the scheduling message comprises a first UL grant for the first channel and a second UL grant for the second channel. In some examples of the method, apparatus, or non-transitory computer-readable medium described above, a first MCS of the first UL grant is different from a second MCS of the second UL grant.

DETAILED DESCRIPTION

In contention based wireless systems, a listen-before-talk (LBT) procedure may be performed prior to transmission. For example, a device may perform a clear channel assessment (CCA) on a channel by detecting a threshold energy level. In some cases, a transmitter may perform an extended CCA (eCCA) that includes multiple CCA measurements. In some networks, a base station may perform the eCCA to determine availability of a channel for uplink transmission by a user equipment (UE).

In some cases, a base station may determine that an eCCA has failed for a channel, but the channel may be available from the perspective of the UE. Accordingly, in multi-channel operations the LBT state for a carrier may be used to determine whether an opportunistic extended channel grant should be used. That is, a base station may send an opportunistic grant if a one or more CCAs pass, even though an eCCA has not passed, while the grant itself is transmitted over the channels that have passed the eCCA. When the UE receives the UL grant, it may perform single CCA on channels used for transmitting the grant message and may perform a full eCCA on channels included in the grant, but not used for transmission of the grant message.

In some cases, two different UL grants may be transmitted in a DL burst for the same UE. The first UL grant may cover the channels that passed eCCA on the base station side, and the second UL grant may cover the opportunistic channels (e.g., channels that passed CCA on the base station side, but not eCCA). The grants may reflect the different reliability of the two sets of channels and may use different modulation and coding schemes (MCS).

Aspects of the disclosure are initially described in the context of a wireless communication system. Several grant configurations are described representing different examples of uplink grants and the associated uplink transmissions. Aspects of the disclosure are further illustrated by and described with reference to apparatus diagrams, system diagrams, and flowcharts that relate to opportunistic extended channel uplink grants for ECC.

Figure 1:
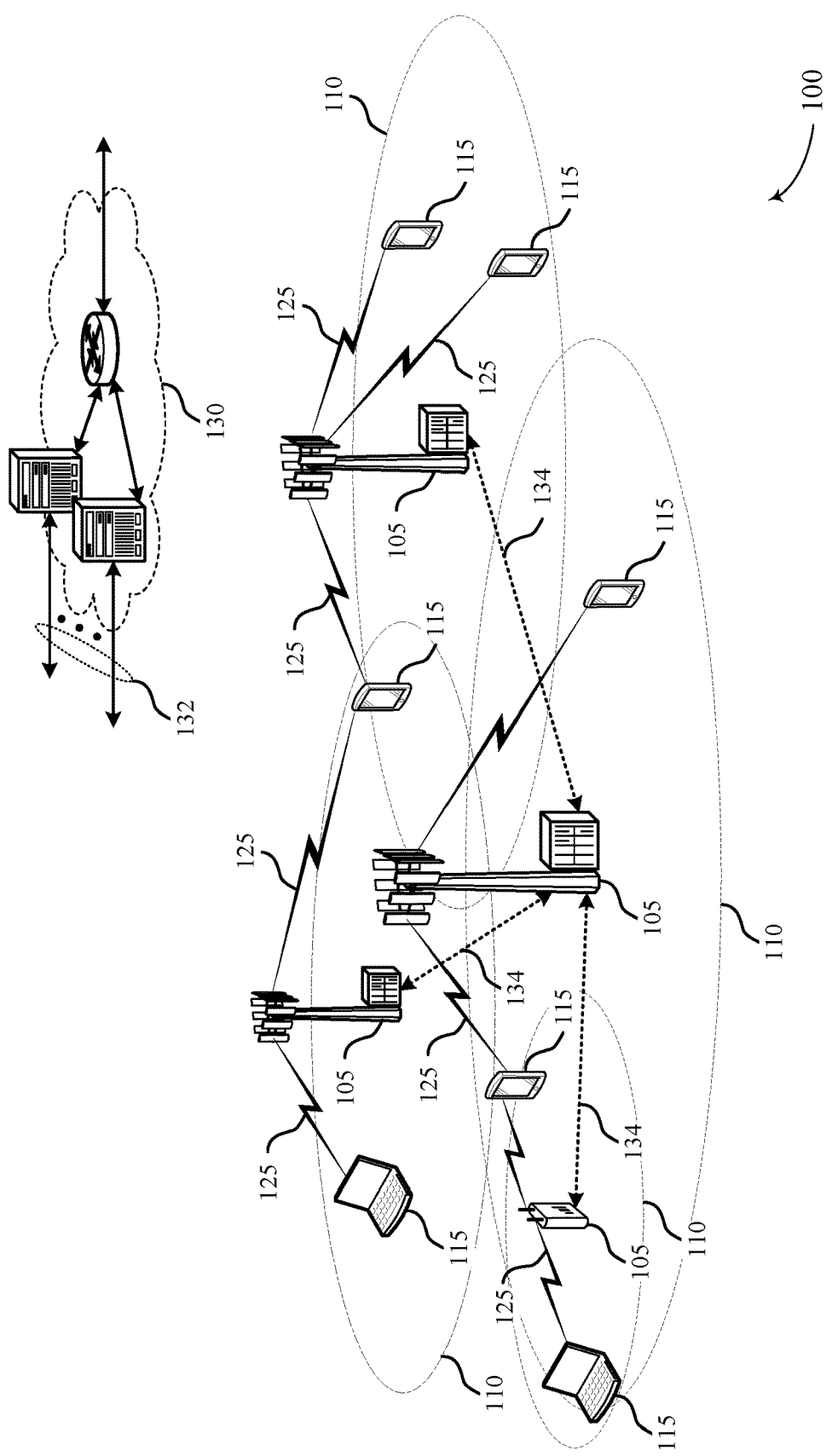
FIG. 1 illustrates an example of a wireless communications system that supports opportunistic extended channel uplink grants for ECC in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. Wireless communications system 100 may support opportunistic extended channel UL grants for ECC based on a modified LBT procedure.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, a UE 115 or base station 105 may operate in a shared or unlicensed frequency spectrum. These devices may perform a CCA prior to communicating in order to determine whether the channel is available. A CCA may include an energy detection procedure to determine whether there are any other active transmissions. For example, the device may infer that a change in a received signal strength indication (RSSI) of a power meter indicates that a channel is occupied. Specifically, signal power that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence. In some cases, an extended CCA (eCCA) may be used to determine whether a channel is clear of interference from neighboring devices. An eCCA may include performing multiple CCA procedures. Each time a CCA passes, a counter may be reduced. If the counter reaches zero for a specific channel, it may be determined that the eCCA has passed for that channel.

In some cases, wireless communications system 100 may utilize one or more enhanced component carriers (ECCs). An ECC may be characterized by one or more features including: flexible bandwidth, different transmission time interval (TTI)s, and modified control channel configuration. In some cases, an ECC may be associated with a carrier aggregation (CA) configuration or a dual connectivity configuration (e.g., when multiple serving cells have a suboptimal backhaul link). An ECC may also be configured for use in unlicensed spectrum or shared spectrum (e.g., where more than one operator is licensed to use the spectrum). An ECC characterized by flexible bandwidth may include one or more segments that may be utilized by UEs 115 that are not capable of monitoring the whole bandwidth or prefer to use a limited bandwidth (e.g., to conserve power).

In some cases, an ECC may utilize a different TTI length than other component carriers (CCs), which may include use of a reduced or variable symbol duration as compared with TTIs of the other CCs. The symbol duration may remain the same, in some cases, but each symbol may represent a distinct TTI. In some examples, an ECC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may also be associated with increased subcarrier spacing. In conjunction with the reduced TTI length, an ECC may utilize dynamic time division duplex (TDD) operation (i.e., it may switch from DL to UL operation for short bursts according to dynamic conditions). Flexible bandwidth and variable TTIs may be associated with a modified control channel configuration (e.g., an ECC may utilize an enhanced physical downlink control channel (ePDCCH) for DL control information).

For example, one or more control channels of an ECC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An ECC may also include modified or additional hybrid automatic repeat request (HARM) related control information.

Thus, wireless communication system 100 may utilize an LBT procedure prior to transmission. A base station 105 may pass an eCCA on one channel and pass a single CCA on another channel. The base station 105 may then send a grant for a UE 115 to transmit on both channels. The UE 115 may receive the grant, and pass a single CCA on the first channel and an eCCA on the second channel. The UE 115 may then transmit uplink information on both the first channel and the second channel. That is, the base station 105 may send an opportunistic grant for transmitting on the second channel even though it may not have passed eCCA at the base station 105. The UE 115 may then use the channel if it passes an eCCA.

Figure 2:
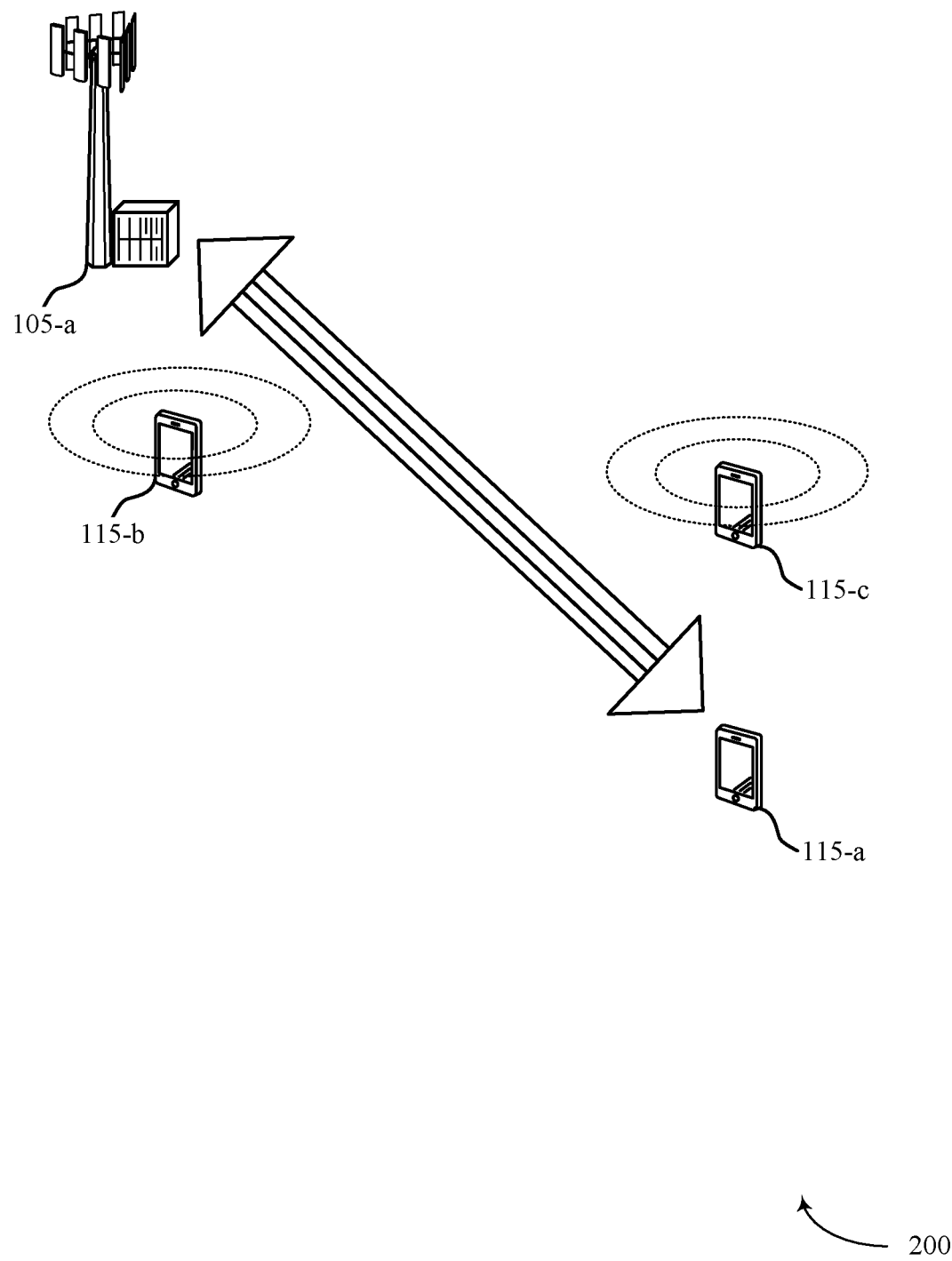
FIG. 2 illustrates an example of a wireless communications system that supports opportunistic extended channel uplink grants for ECC in accordance with aspects of the present disclosure.

FIG. 2 illustrates an example of a wireless communications system 200 for opportunistic extended channel uplink grants for ECC. Wireless communications system 200 may include base station 105-a and UEs 115-a, 115-b, and 115-c, which may be examples of the corresponding devices described with reference to FIG. 1. Wireless communications system 200 may support opportunistic extended channel UL grants for ECC based on a modified LBT procedure.

That is, wireless communications system 200 may support operations in contention based system. Therefore, base station 105-a and UE 115-a may utilize an LBT procedure prior to transmitting. For example, base station 105-a or UE 115-a may perform a CCA on a channel by detecting a threshold energy level. In some cases, base station 105-a or UE 115-a may perform an eCCA that includes multiple CCA measurements. For example, a counter may be used to determine whether a sufficient number of CCA attempts have passed before determining that a channel is available.

In some cases, base station 105-a may perform the eCCA to determine availability of a channel for uplink transmission by a UE 115-a. Other neighboring devices (for example, UE 115-b or UE 115-c) may be transmitting on the channel(s) to be used by base station 105-a, which may cause interference if two devices transmit simultaneously. Thus, base station 105-a may attempt eCCA on each channel, and send a grant for those channels that are available. Base station 105-a may transmit an UL grant in a short DL burst over the channels that passed the eCCA. When UE 115-a receives the UL grant, it may not perform an eCCA again on the granted channels before UL transmission. Instead, UE 115-a may perform single CCA over these channels and, if the CCA passes, UE 115-a may transmit data over the channel. In some cases, UE 115-a may transmit on a subset of the granted channels if not all of them pass the CCA. UE 115-a may perform an eCCA on a granted channel if the CCA does not pass, and transmit on the channel if the eCCA passes prior to the end of the grant.

In some cases, base station 105-a may determine that an eCCA has failed for a channel, but the channel may be available from the perspective of UE 115-a. That is, at the time of the transmission of the grant there may be three possible states for each channel: the eCCA passes on base station 105-a side; eCCA fails on base station 105-a side, but CCA passes; or the CCA (and the eCCA) fails. Thus, in some cases, base station 105-a may check out the channels that passed eCCA and may send UL grants on the channels. However, the UL grant may also indicate resources in the channels that failed eCCA but passed CCA. These may be known as opportunistic grants.

UE 115-a may receive the grant and compare the channels granted with the channel(s) used for transmitting the grant. For the channels both granted and used in the DL burst, UE 115-a may assume the channels passed eCCA at base station 105-a, and may use them after performing a single CCA. In some other cases, UE 115-a may assume that the channels granted but not used by base station 105-a to transmit the grant did not pass eCCA at base station 105-a. That is, UE 115-a may monitor these channels to determine whether an eCCA passes (i.e., the CCA counter reaches 0) on UE 115-a side. If the eCCA passes, UE 115-a may transmit the uplink data according to the grant. If UE 115-a eCCA counter for the channels is small, the extra time between base station 105-a DL burst and the granted UL burst may be enough to let the eCCA counter count down to 0. Thus, UE 115-a may pass eCCA on those channels even though base station 105-a did not and may use these channels to transmit uplink data.

Accordingly, in multi-channel operations the LBT state for a carrier may be used to determine whether an opportunistic extended channel grant should be used. The LBT state here may include a counter number for eCCA operation and a CCA status based on one or more CCA attempts.

Base station 105-a may use the CCA status to estimate the future availability of a channel on UE 115-a side. For example, if the latest CCA for a channel failed, it may be appropriate to avoid the channel because interference is expected to remain on the channel. If the latest CCA passes, and eCCA counter for a channel is close to zero, it may be more likely that UE 115-a can clear the channel itself. If the latest CCA passes, and the eCCA counter for the channel is far from zero, UE 115-a may be less likely to clear the channel, and an extended channel grant may not help. In some cases, a UE-side eCCA may be significantly different if the interference source (for example, UE 115-b) is closer to base station 105-a.

If UE 115-a fails CCA before a scheduled UL burst, it may begin an eCCA and may start transmitting if the eCCA passes before the granted UL burst ends. If UE 115-a passes the CCA on some channels, but some channels do not pass an eCCA, UE 115-a may choose to wait till the eCCA passes to use more channels. However, waiting may increase the likelihood of losing the channels that passed CCA.

In some other cases, two UL grants may be transmitted in a DL burst for UE 115-a. The first UL grant may cover the channels that passed eCCA on base station 105-a side, and the second UL grant may cover the opportunistic channels (e.g., channels that passed CCA on base station 105-a side, but not eCCA). The grants may reflect the different reliability of the two sets of channels granted by them. For example, the grants may use a different MCS.

Figure 3A:
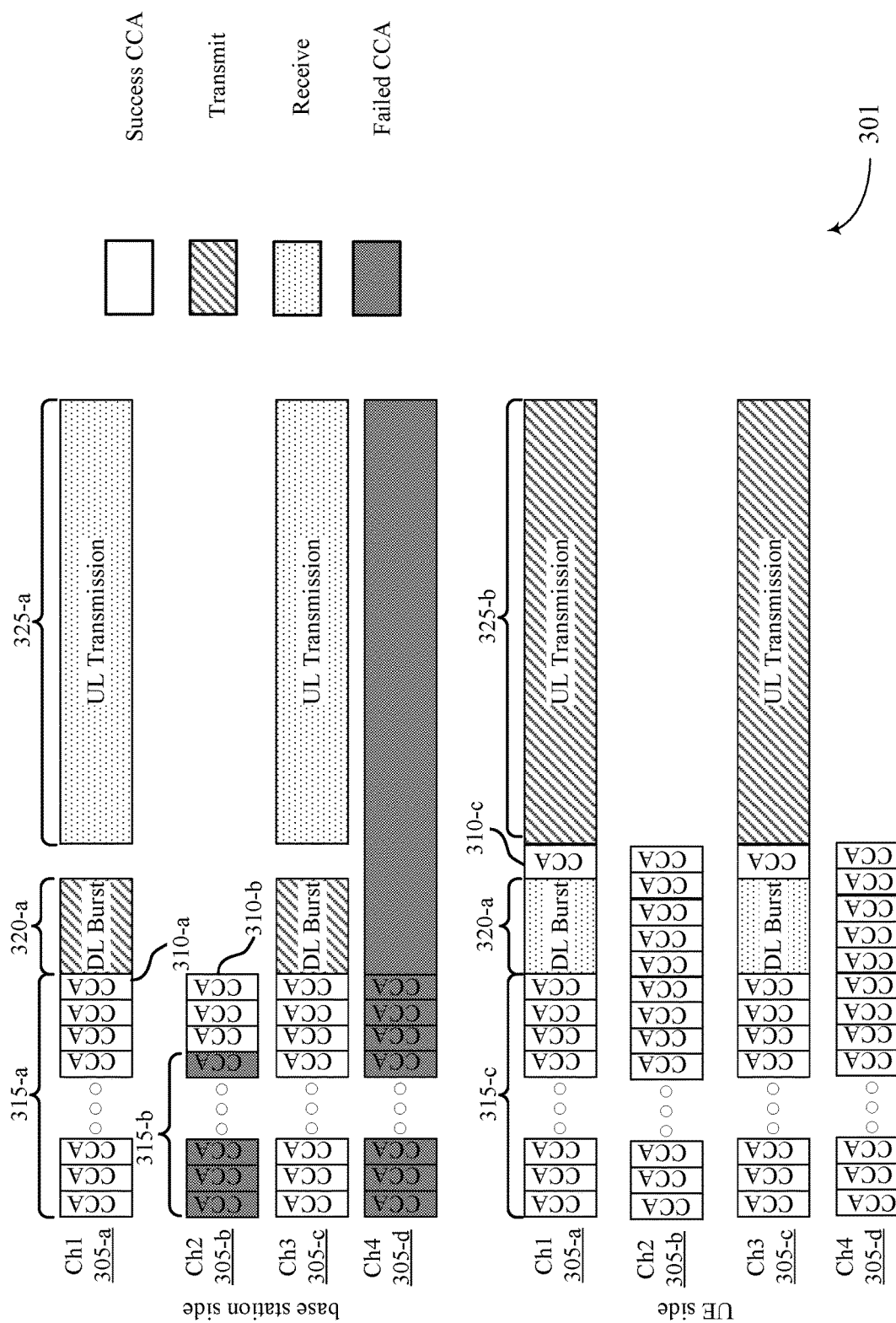
FIGS. 3A, 3B, and 3C illustrate examples of grant configurations that support opportunistic extended channel uplink grants for ECC in accordance with aspects of the present disclosure.
Figure 3B:
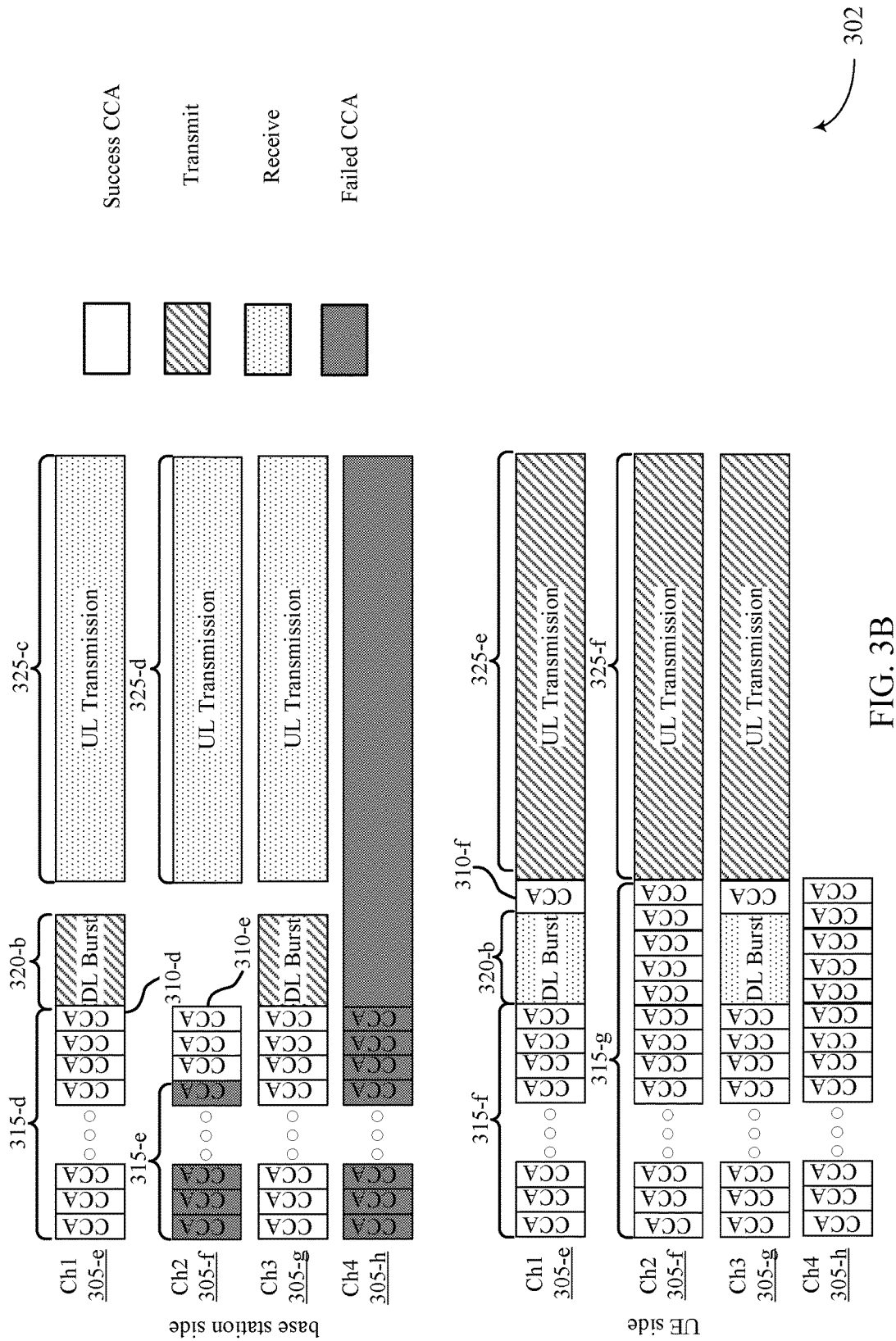
Figure 3C:
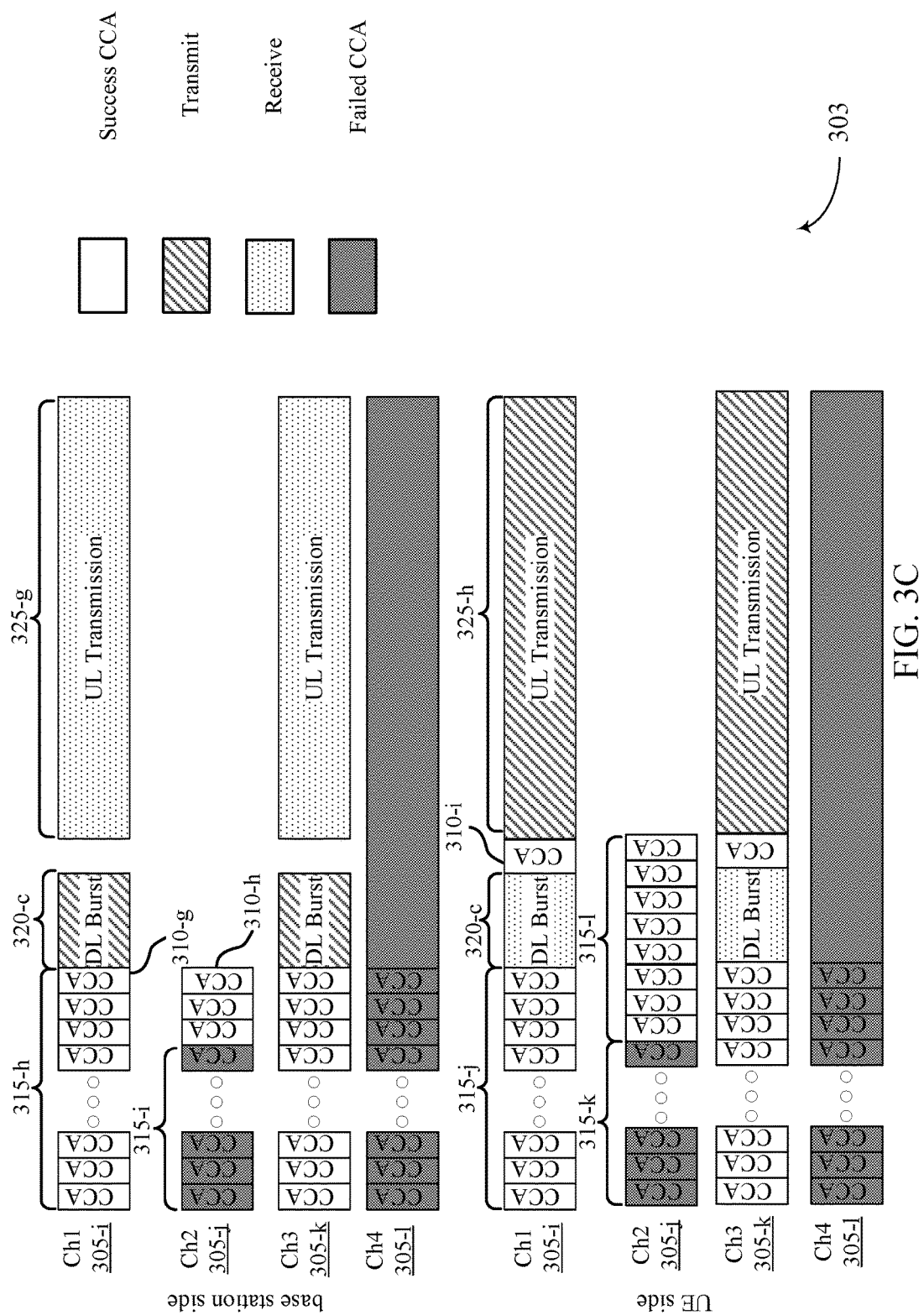

FIGS. 3A, 3B, and 3C illustrate examples of grant configurations 301, 302 and 303 for opportunistic extended channel uplink grants for ECC. In some cases, grant configurations 301-303 may represent aspects of techniques performed by a UE 115 or base station 105 as described with reference to FIGS. 1-2.

In grant configuration 301, interference may be detected by a base station 105, and a UE 115 may not see it. Based on the interference, the base station 105 may refrain from sending an UL grant for the channel that failed eCCA.

That is, base station 105 may perform eCCA on multiple channels (for example, first channel 305-a, second channel 305-b, third channel 305-c, and fourth channel 305-d). At base station 105, first channel 305-a and third channel 305-c pass eCCA 315-a (including CCA 310-a), and second channel 305-b fails eCCA 315-b (despite passing CCA 310-b).

Base station 105 may check out first channel 305-a and third channel 305-c by transmitting a DL Burst 320-a with UL grant over it. The UL grant may cover first channel 305-a and third channel 305-c. Base station 105 may receive UL Transmission 325-a from UE 115.

At UE 115, first channel 305-a and third channel 305-c pass eCCA 315-c. UE 115 may receive the UL grant and may perform a single CCA 310-c on first channel 305-a and third channel 305-c. Following a successful CCA 310-c, UE 115 may transmit UL data over first channel 305-a and third channel 305-c through UL Transmission 325-b.

In grant configuration 302, the interference may be detected by base station 105, and UE 115 may not see it. However, base station 105 may transmit an opportunistic grant based on passing an eCCA.

Base station 105 may perform eCCA on multiple channels (for example, first channel 305-e, second channel 305-f, third channel 305-g, and fourth channel 305-h). First channel 305-e and third channel 305-g pass eCCA 315-d (including CCA 310-d); second channel 305-f fails eCCA 315-e, but may pass CCA 310-e.

Base station 105 may check out first channel 305-e and third channel 305-g by transmitting a DL Burst 320-b with UL grant over it; second channel 305-f may be included in the UL grant transmitted through DL Burst 320-b. Base station 105 may receive UL Transmission 325-c and UL Transmission 325-d from UE 115.

At UE 115, first channel 305-e and third channel 305-g pass eCCA 315-f UE 115 may receive the UL grant and may perform a single CCA 310-f on first channel 305-e and third channel 305-g, it may also perform eCCA 315-g on second channel 305-f. Following a successful eCCA 315-f, UE 115 may transmit UL data over first channel 305-e and third channel 305-g through UL transmission 325-e. In some cases, following a successful eCCA 315-g on second channel 305-f, UE 115 may also transmit data over second channel 305-f through UL Transmission 325-f.

In grant configuration 303, the interference may be detected by both the base station 105 and UE 115. The base station 105 may transmit an opportunistic grant, but the UE 115 may refrain from transmitting until it passes an eCCA.

Base station 105 may perform eCCA on multiple channels (for example, first channel 305-i, second channel 305-j, third channel 305-k, and fourth channel 305-1). First channel 305-i and third channel 305-k pass eCCA 315-h (including CCA 310-g); second channel 305-j fails eCCA 315-i, but may pass CCA 310-h.

Base station 105 may check out first channel 305-i and third channel 305-k by transmitting a DL Burst 320-c with UL grant over it; second channel 305-j may be included in the UL grant transmitted through DL Burst 320-c. Base station 105 may receive UL Transmission 325-g from UE 115.

At UE 115, first channel 305-i and third channel 305-k pass eCCA 315-j; second channel 305-j fails eCCA 315-k. UE 115 may receive the UL grant and may perform a single CCA 310-i on first channel 305-i and third channel 305-k, it may also perform eCCA 315-1 on second channel 305-j. Following a successful CCA 310-f, UE 115 may transmit UL data over first channel 305-i and third channel 305-k through UL Transmission 325-h. In some cases, eCCA 315-1 may not be successful on second channel 305-j; UE 115 may not transmit data on second channel 305-j.

Figure 4:
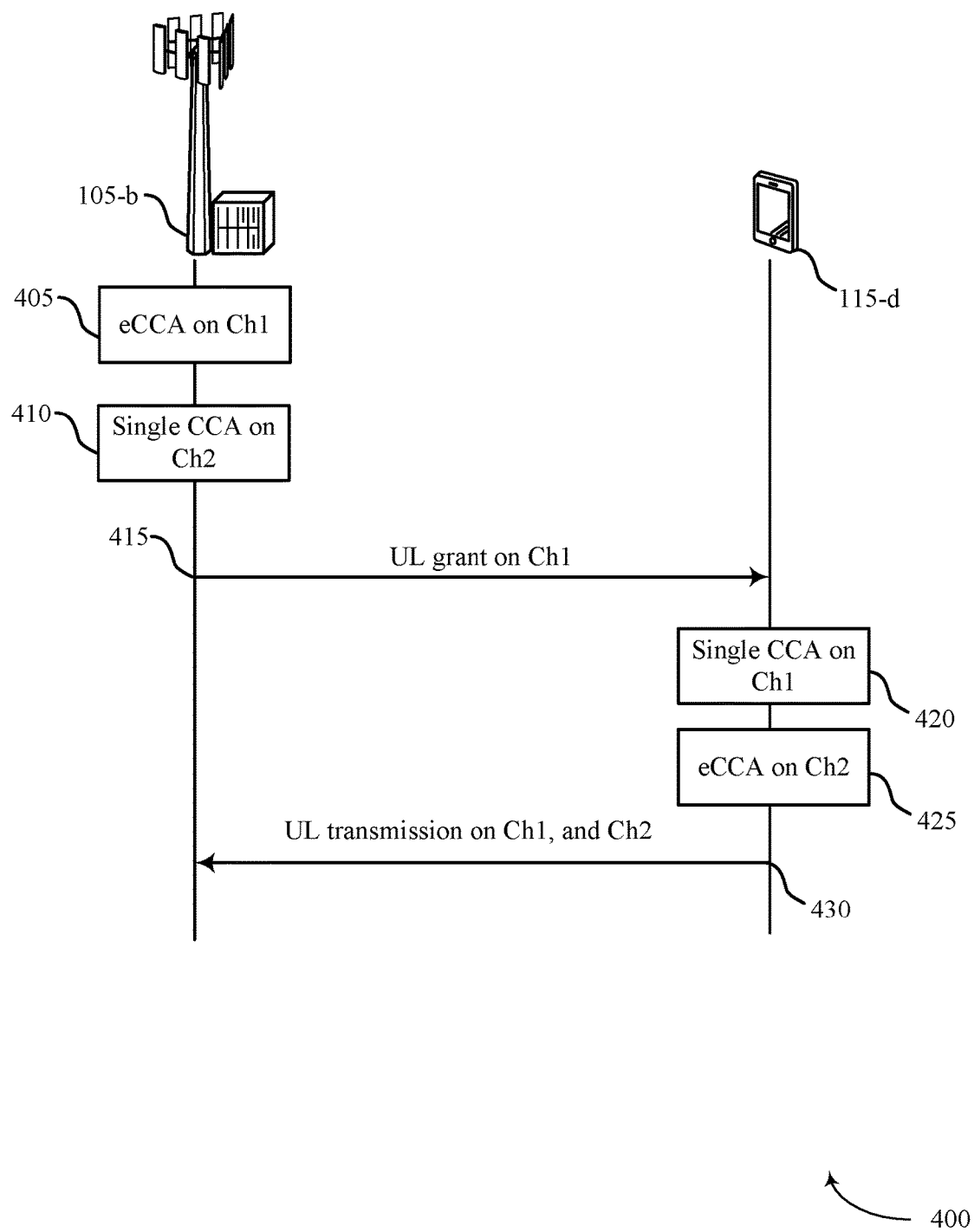
FIG. 4 illustrates an example of a process flow in a system that supports opportunistic extended channel uplink grants for ECC in accordance with aspects of the present disclosure.

FIG. 4 illustrates an example of a process flow 400 for opportunistic extended channel uplink grants for ECC in accordance with various aspects of the present disclosure. Process flow 400 may include base station 105-b and UE 115-d, which may be examples of the corresponding devices described with reference to FIG. 1-2.

At step 405, base station 105-b may determine the availability of first channel (Ch1) and second channel (Ch2), by performing an eCCA on each channel. The eCCA may pass on the first channel, and fail on the second channel. At step 410, base station 105-b may perform a single CCA on the second channel. Thus, base station 105-b may determine that a first eCCA check on a first channel is successful and that a second eCCA check on a second channel is unsuccessful At step 415, a UL grant may be sent over the first channel to UE 115-d. The UL grant may also indicate if the second channel failed eCCA, but may have passed CCA. Thus, UE 115-d may receive a scheduling message on a first channel, the scheduling message identifying the first channel and a second channel.

At step 420, UE 115-d may receive the UL grant and may perform a single CCA on the first channel. Thus, UE 115-d may perform a first channel clearance procedure on the first channel based on receiving the scheduling message on the first channel. The first channel clearance procedure may include performing a single CCA check, and then performing an eCCA check if the single CCA check is unsuccessful.

At step 425, UE 115-d may perform eCCA on the second channel. Thus, UE 115-d may perform a second channel clearance procedure on the second channel based on determining that the scheduling message has not been received on the second channel. The single CCA check may include determining whether the first channel is clear based on a single CCA. In some cases, the second channel clearance procedure may depend on determining that a single CCA check is not sufficient to gain access to the second channel. That is, UE 115-d may recognize that the grant was not transmitted on the second channel, and select a different (extended) channel procedure accordingly.

At step 430, UE 115-d may perform UL transmission on the first channel (if step 420 was successful), and on the second channel (if step 425 was successful). Thus, UE 115-d may transmit uplink data on the first channel based on the first channel clearance procedure, and may transmit uplink data on the second channel based on the second channel clearance procedure.

Figure 5:
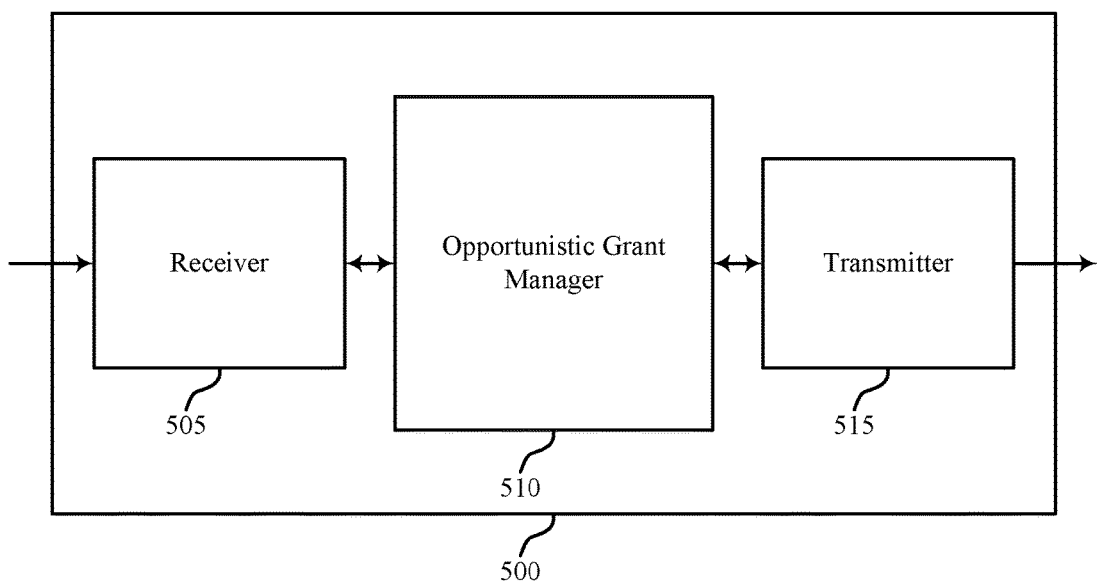
FIGS. 5 through 7 show block diagrams of a wireless device that supports opportunistic extended channel uplink grants for ECC in accordance with aspects of the present disclosure.

FIG. 5 shows a block diagram of a wireless device 500 that supports opportunistic extended channel uplink grants for ECC in accordance with various aspects of the present disclosure. Wireless device 500 may be an example of aspects of a UE 115 described with reference to FIGS. 1 and 2. Wireless device 500 may include receiver 505, opportunistic grant manager 510 and transmitter 515. Wireless device 500 may also include a processor. Each of these components may be in communication with each other.

The receiver 505 may receive information such as packets, user data, or control information associated with various information channels (e.g., control channels, data channels, and information related to opportunistic extended channel uplink grants for ECC, etc.). Information may be passed on to other components of the device. The receiver 505 may be an example of aspects of the transceiver 825 described with reference to FIG. 8.

The opportunistic grant manager 510 may receive a scheduling message on a first channel, the scheduling message identifying the first channel and a second channel, perform a first channel clearance procedure on the first channel based at least in part on receiving the scheduling message on the first channel, and perform a second channel clearance procedure on the second channel based at least in part on determining that the scheduling message has not been received on the second channel. The opportunistic grant manager 510 may also be an example of aspects of the opportunistic grant manager 805 described with reference to FIG. 8.

The transmitter 515 may transmit signals received from other components of wireless device 500. In some examples, the transmitter 515 may be collocated with a receiver in a transceiver module. For example, the transmitter 515 may be an example of aspects of the transceiver 825 described with reference to FIG. 8. The transmitter 515 may include a single antenna, or it may include a plurality of antennas.

Figure 6:
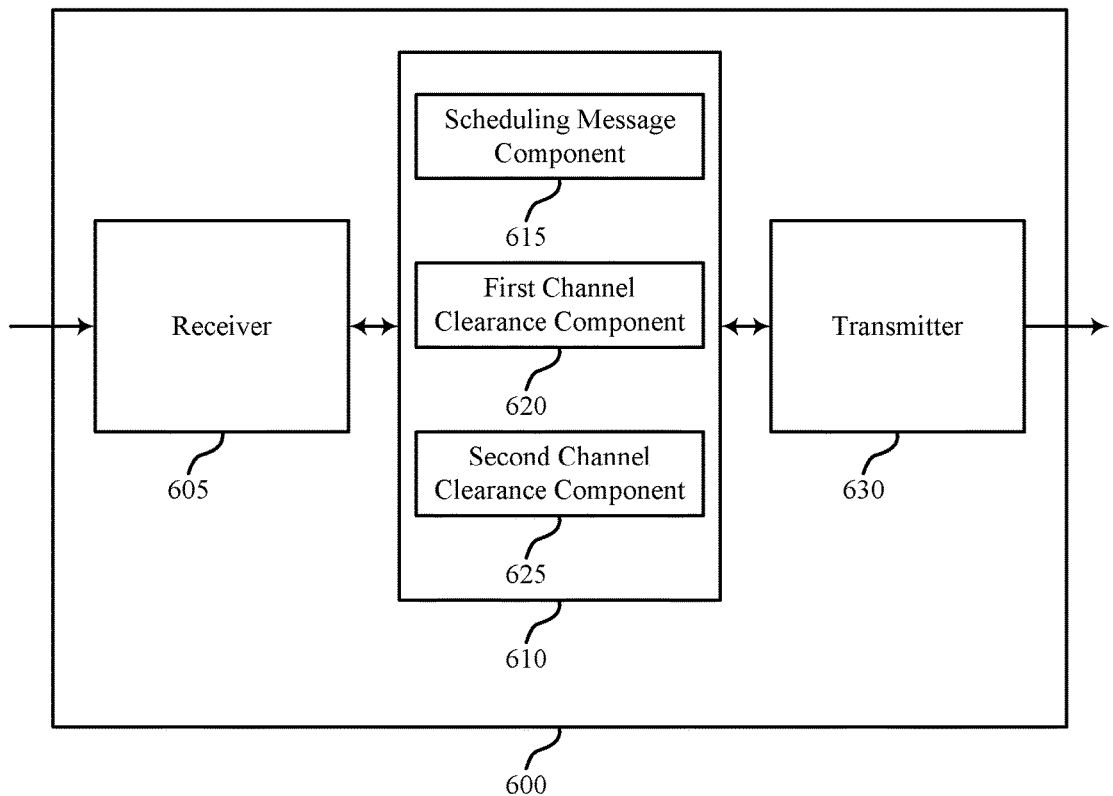

FIG. 6 shows a block diagram of a wireless device 600 that supports opportunistic extended channel uplink grants for ECC in accordance with various aspects of the present disclosure. Wireless device 600 may be an example of aspects of a wireless device 500 or a UE 115 described with reference to FIGS. 1, 2 and 5. Wireless device 600 may include receiver 605, opportunistic grant manager 610 and transmitter 630. Wireless device 600 may also include a processor. Each of these components may be in communication with each other.

The receiver 605 may receive information which may be passed on to other components of the device. The receiver 605 may also perform the functions described with reference to the receiver 505 of FIG. 5. The receiver 605 may be an example of aspects of the transceiver 825 described with reference to FIG. 8.

The opportunistic grant manager 610 may be an example of aspects of opportunistic grant manager 510 described with reference to FIG. 5. The opportunistic grant manager 610 may include scheduling message component 615, first channel clearance component 620 and second channel clearance component 625. The opportunistic grant manager 610 may be an example of aspects of the opportunistic grant manager 805 described with reference to FIG. 8.

The scheduling message component 615 may receive a scheduling message on a first channel, the scheduling message identifying the first channel and a second channel. In some cases, the scheduling message includes a first uplink grant for the first channel and a second uplink grant for the second channel.

The first channel clearance component 620 may perform a first channel clearance procedure on the first channel based at least in part on receiving the scheduling message on the first channel. In some cases, performing the first channel clearance procedure includes performing a single clear channel assessment check, and performing an eCCA check if the single clear channel assessment check is unsuccessful.

The second channel clearance component 625 may perform a second channel clearance procedure on the second channel based at least in part on determining that the scheduling message has not been received on the second channel. In some cases, performing the second channel clearance procedure includes determining that a single clear channel assessment check is not sufficient to gain access to the second channel.

The transmitter 630 may transmit signals received from other components of wireless device 600. In some examples, the transmitter 630 may be collocated with a receiver in a transceiver module. For example, the transmitter 630 may be an example of aspects of the transceiver 825 described with reference to FIG. 8. The transmitter 630 may utilize a single antenna, or it may utilize a plurality of antennas.

Figure 7:
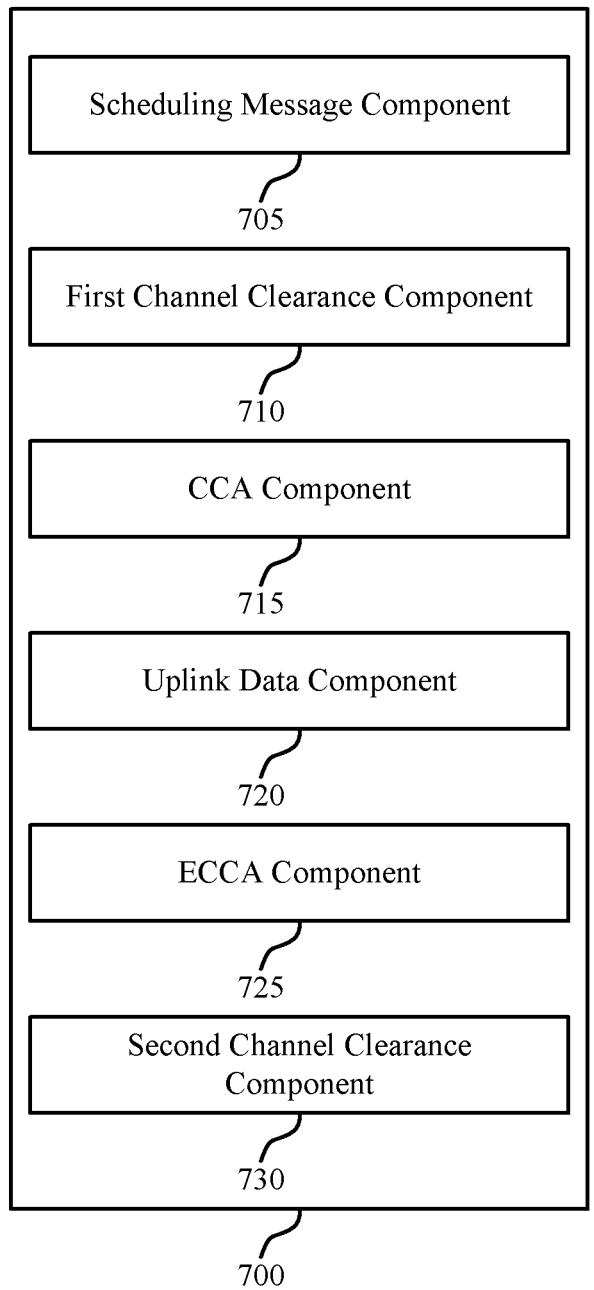

FIG. 7 shows a block diagram of an opportunistic grant manager 700 which may be an example of the corresponding component of wireless device 500 or wireless device 600. That is, opportunistic grant manager 700 may be an example of aspects of opportunistic grant manager 510 or opportunistic grant manager 610 described with reference to FIGS. 5 and 6. The opportunistic grant manager 700 may also be an example of aspects of the opportunistic grant manager 805 described with reference to FIG. 8.

The opportunistic grant manager 700 may include scheduling message component 705, first channel clearance component 710, CCA component 715, uplink data component 720, eCCA component 725 and second channel clearance component 730. Each of these modules may communicate, directly or indirectly, with one another (e.g., via one or more buses).

The scheduling message component 705 may receive a scheduling message on a first channel, the scheduling message identifying the first channel and a second channel. In some cases, the scheduling message includes a first uplink grant for the first channel and a second uplink grant for the second channel.

The first channel clearance component 710 may perform a first channel clearance procedure on the first channel based at least in part on receiving the scheduling message on the first channel. In some cases, performing the first channel clearance procedure includes performing a single clear channel assessment check, and performing an eCCA check if the single clear channel assessment check is unsuccessful.

The CCA component 715 may be configured such that performing the single clear channel assessment check includes determining whether the first channel is clear based at least in part on a single clear channel assessment.

The uplink data component 720 may transmit uplink data on the first channel based at least in part on the first channel clearance procedure, and transmit uplink data on the second channel based at least in part on the second channel clearance procedure, wherein the transmitted uplink data includes an indication of whether the first channel, the second channel or both are being used. In some cases, a first modulation and coding scheme of the first uplink grant is different from a second modulation and coding scheme of the second uplink grant.

The eCCA component 725 may be configured such that performing the second channel clearance procedure includes performing an eCCA check.

The second channel clearance component 730 may be configured such that performing the second channel clearance procedure includes performing an eCCA check.

Figure 8:
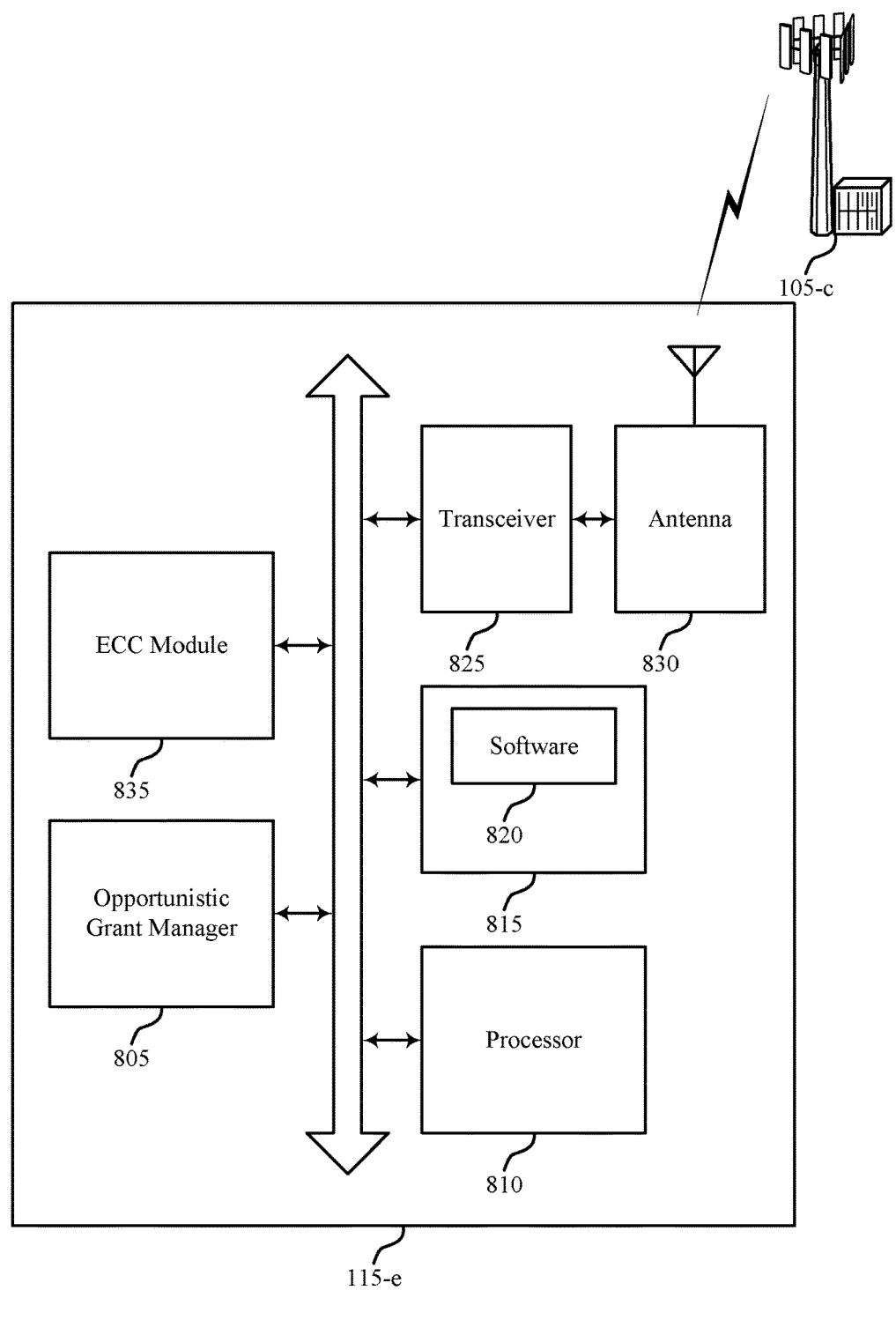
FIG. 8 illustrates a block diagram of a system including a UE that supports opportunistic extended channel uplink grants for ECC in accordance with aspects of the present disclosure.

FIG. 8 shows a diagram of a system 800 including a device that supports opportunistic extended channel uplink grants for ECC in accordance with various aspects of the present disclosure. For example, system 800 may include UE 115-e, which may be an example of a wireless device 500, a wireless device 600, or a UE 115 as described with reference to FIGS. 1, 2 and 5 through 7. UE 115-e may also include opportunistic grant manager 805, processor 810, memory 815, transceiver 825, antenna 830 and ECC module 835. Each of these modules may communicate, directly or indirectly, with one another (e.g., via one or more buses). The opportunistic grant manager 805 may be an example of an opportunistic grant manager as described with reference to FIGS. 5 through 7.

The processor 810 may include an intelligent hardware device, (e.g., a central processing unit (CPU), a microcontroller, an application specific integrated circuit (ASIC), etc.) The memory 815 may include random access memory (RAM) and read only memory (ROM). The memory 815 may store computer-readable, computer-executable software including instructions that, when executed, cause the processor to perform various functions described herein (e.g., opportunistic extended channel uplink grants for ECC, etc.). In some cases, the software 820 may not be directly executable by the processor but may cause a computer (e.g., when compiled and executed) to perform functions described herein.

The transceiver 825 may communicate bi-directionally, via one or more antennas, wired, or wireless links, with one or more networks, as described above. For example, the transceiver 825 may communicate bi-directionally with a base station 105 or a UE 115. The transceiver 825 may also include a modem to modulate the packets and provide the modulated packets to the antennas for transmission, and to demodulate packets received from the antennas. In some cases, the wireless device may include a single antenna 830. However, in some cases the device may have more than one antenna 830, which may be capable of concurrently transmitting or receiving multiple wireless transmissions.

The ECC module 835 may enable operations using ECCs such as communication using shared or unlicensed spectrum, using reduced TTIs or subframe durations, or using a large number of CCs.

Figure 9:
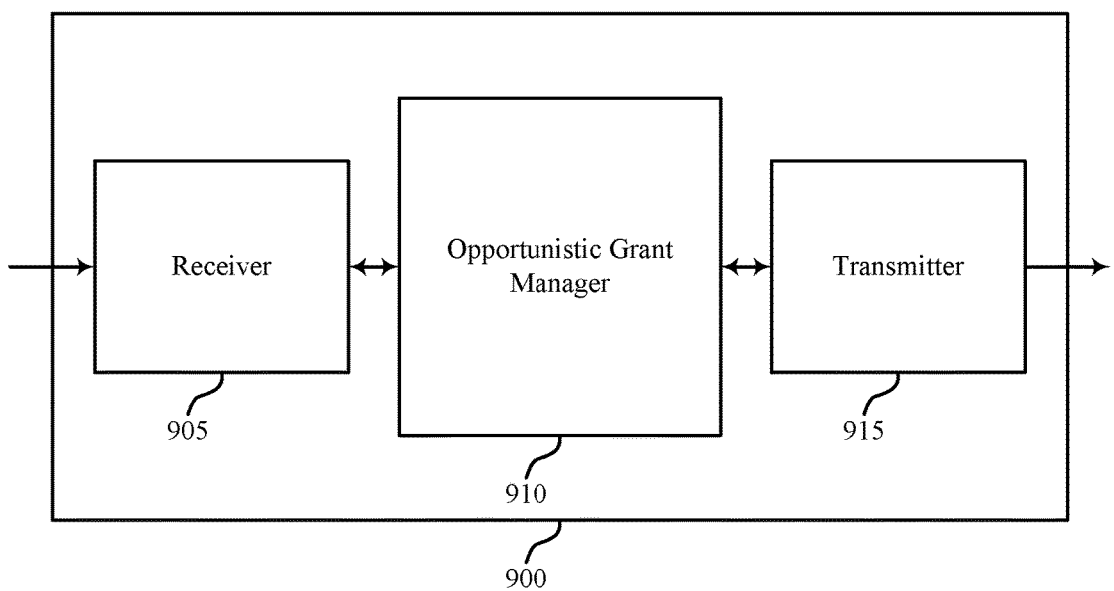
FIGS. 9 through 11 show block diagrams of a wireless device that supports opportunistic extended channel uplink grants for ECC in accordance with aspects of the present disclosure.

FIG. 9 shows a block diagram of a wireless device 900 that supports opportunistic extended channel uplink grants for ECC in accordance with various aspects of the present disclosure. Wireless device 900 may be an example of aspects of a base station 105 described with reference to FIGS. 1 and 2. Wireless device 900 may include receiver 905, opportunistic grant manager 910 and transmitter 915. Wireless device 900 may also include a processor. Each of these components may be in communication with each other.

The receiver 905 may receive information such as packets, user data, or control information associated with various information channels (e.g., control channels, data channels, and information related to opportunistic extended channel uplink grants for ECC, etc.). Information may be passed on to other components of the device. The receiver 905 may be an example of aspects of the transceiver 1225 described with reference to FIG. 12.

The opportunistic grant manager 910 may determine that a first eCCA check on a first channel is successful and that a second eCCA check on a second channel is unsuccessful, and transmit a scheduling message on the first channel based on the determination, the scheduling message identifying the first channel and the second channel. The opportunistic grant manager 910 may also be an example of aspects of the opportunistic grant manager 1205 described with reference to FIG. 12.

The transmitter 915 may transmit signals received from other components of wireless device 900. In some examples, the transmitter 915 may be collocated with a receiver in a transceiver module. For example, the transmitter 915 may be an example of aspects of the transceiver 1225 described with reference to FIG. 12. The transmitter 915 may include a single antenna, or it may include a plurality of antennas.

Figure 10:
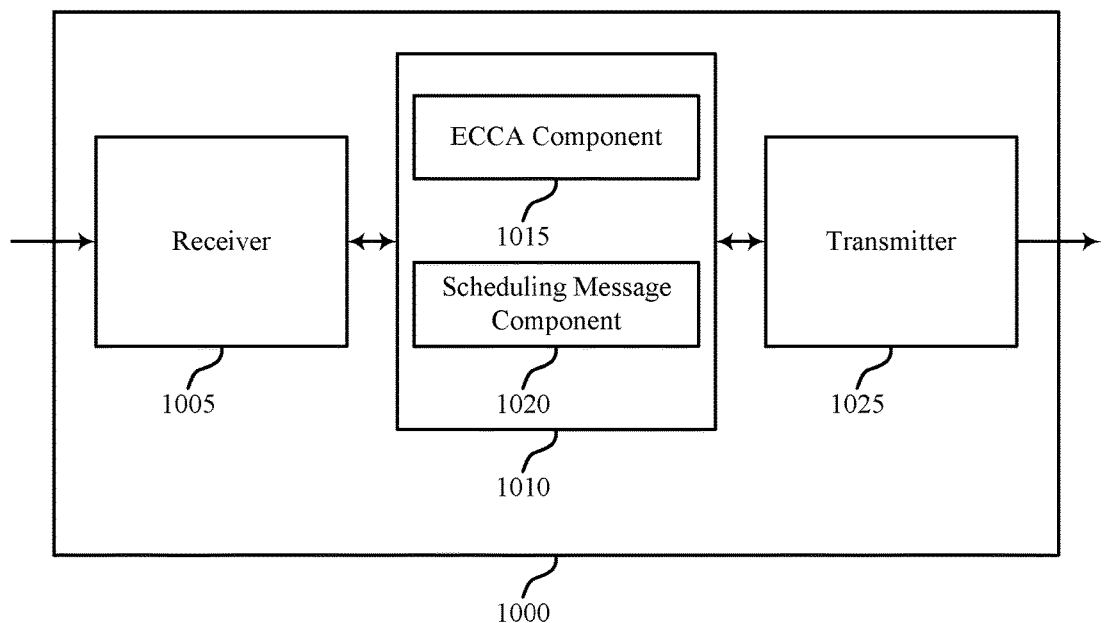

FIG. 10 shows a block diagram of a wireless device 1000 that supports opportunistic extended channel uplink grants for ECC in accordance with various aspects of the present disclosure. Wireless device 1000 may be an example of aspects of a wireless device 900 or a base station 105 described with reference to FIGS. 1, 2 and 9. Wireless device 1000 may include receiver 1005, opportunistic grant manager 1010 and transmitter 1025. Wireless device 1000 may also include a processor. Each of these components may be in communication with each other.

The receiver 1005 may receive information which may be passed on to other components of the device. The receiver 1005 may also perform the functions described with reference to the receiver 905 of FIG. 9. The receiver 1005 may be an example of aspects of the transceiver 1225 described with reference to FIG. 12.

The opportunistic grant manager 1010 may be an example of aspects of opportunistic grant manager 910 described with reference to FIG. 9. The opportunistic grant manager 1010 may include eCCA component 1015 and scheduling message component 1020. The opportunistic grant manager 1010 may be an example of aspects of the opportunistic grant manager 1205 described with reference to FIG. 12.

The eCCA component 1015 may determine that a first eCCA check on a first channel is successful and that a second eCCA check on a second channel is unsuccessful.

The scheduling message component 1020 may transmit a scheduling message on the first channel based on the determination, the scheduling message identifying the first channel and the second channel, and refrain from transmitting the scheduling message on the second channel based at least in part on the second eCCA check. In some cases, the scheduling message includes a first uplink grant for the first channel and a second uplink grant for the second channel.

The transmitter 1025 may transmit signals received from other components of wireless device 1000. In some examples, the transmitter 1025 may be collocated with a receiver in a transceiver module. For example, the transmitter 1025 may be an example of aspects of the transceiver 1225 described with reference to FIG. 12. The transmitter 1025 may utilize a single antenna, or it may utilize a plurality of antennas.

Figure 11:
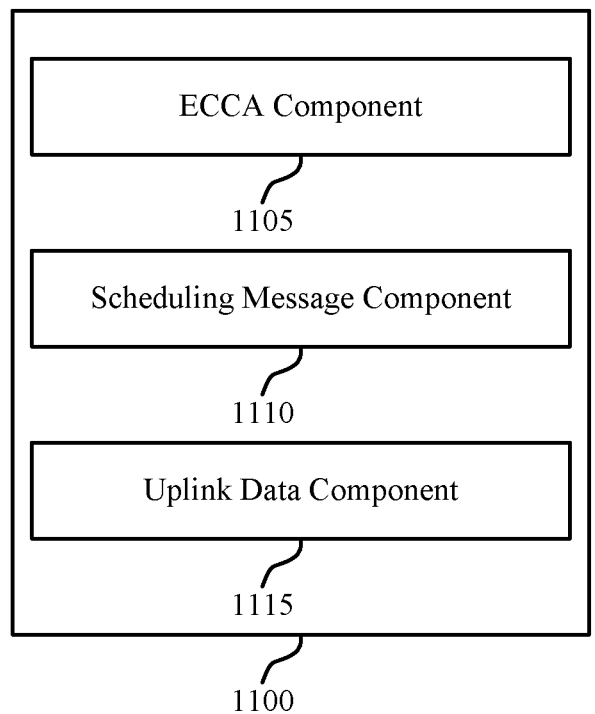

FIG. 11 shows a block diagram of an opportunistic grant manager 1100 which may be an example of the corresponding component of wireless device 900 or wireless device 1000. That is, opportunistic grant manager 1100 may be an example of aspects of opportunistic grant manager 910 or opportunistic grant manager 1010 described with reference to FIGS. 9 and 10. The opportunistic grant manager 1100 may also be an example of aspects of the opportunistic grant manager 1205 described with reference to FIG. 12.

The opportunistic grant manager 1100 may include eCCA component 1105, scheduling message component 1110 and uplink data component 1115. Each of these modules may communicate, directly or indirectly, with one another (e.g., via one or more buses).

The eCCA component 1105 may determine that a first eCCA check on a first channel is successful and that a second eCCA check on a second channel is unsuccessful.

The scheduling message component 1110 may transmit a scheduling message on the first channel based on the determination, the scheduling message identifying the first channel and the second channel, and refrain from transmitting the scheduling message on the second channel based at least in part on the second eCCA check. In some cases, the scheduling message includes a first uplink grant for the first channel and a second uplink grant for the second channel.

The uplink data component 1115 may identify whether the uplink data is being transmitted on the first channel or the second channel or both, and receive uplink data on the first channel or the second channel based at least in part on the scheduling message. In some cases, a first modulation and coding scheme of the first uplink grant is different from a second modulation and coding scheme of the second uplink grant.

Figure 12:
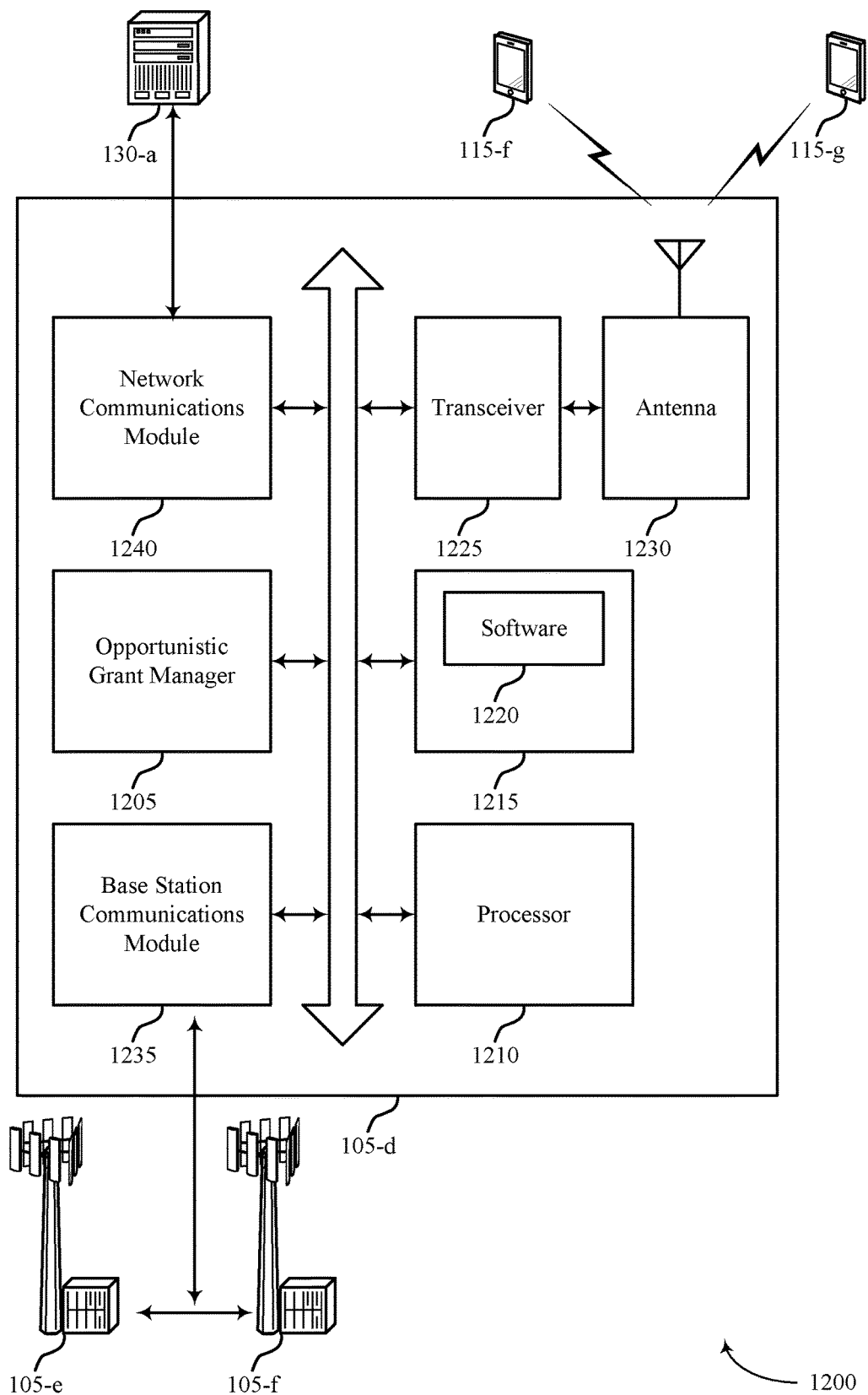
FIG. 12 illustrates a block diagram of a system including a base station that supports opportunistic extended channel uplink grants for ECC in accordance with aspects of the present disclosure.

FIG. 12 shows a diagram of a wireless system 1200 including a device configured that supports opportunistic extended channel uplink grants for ECC in accordance with various aspects of the present disclosure. For example, wireless system 1200 may include base station 105-d, which may be an example of a wireless device 900, a wireless device 1000, or a base station 105 as described with reference to FIGS. 1, 2 and 9 through 11. Base station 105-d may also include components for bi-directional voice and data communications including components for transmitting communications and components for receiving communications. For example, base station 105-d may communicate bi-directionally with one or more UEs 115. Base station 105-d may also include opportunistic grant manager 1205, processor 1210, memory 1215, transceiver 1225, antenna 1230, base station communications module 1235 and network communications module 1240. Each of these modules may communicate, directly or indirectly, with one another (e.g., via one or more buses). The opportunistic grant manager 1205 may be an example of an opportunistic grant manager as described with reference to FIGS. 9 through 11.

The processor 1210 may include an intelligent hardware device, (e.g., a CPU, a microcontroller, an ASIC, etc.) The memory 1215 may include RAM and ROM. The memory 1215 may store computer-readable, computer-executable software including instructions that, when executed, cause the processor to perform various functions described herein (e.g., opportunistic extended channel uplink grants for ECC, etc.). In some cases, the software 1220 may not be directly executable by the processor but may cause a computer (e.g., when compiled and executed) to perform functions described herein.

The transceiver 1225 may communicate bi-directionally, via one or more antennas, wired, or wireless links, with one or more networks, as described above. For example, the transceiver 1225 may communicate bi-directionally with a base station 105 or a UE 115. The transceiver 1225 may also include a modem to modulate the packets and provide the modulated packets to the antennas for transmission, and to demodulate packets received from the antennas. In some cases, the wireless device may include a single antenna 1230. However, in some cases the device may have more than one antenna 830, which may be capable of concurrently transmitting or receiving multiple wireless transmissions.

The base station communications module 1235 may manage communications with other base stations 105, and may include a controller or scheduler for controlling communications with UEs 115 in cooperation with other base stations 105. For example, the base station communications module 1235 may coordinate scheduling for transmissions to UEs 115 for various interference mitigation techniques such as beamforming or joint transmission. In some examples, base station communications module-95 may provide an X2 interface within an LTE/LTE-A wireless communication network technology to provide communication between base stations 105.

The network communications module 1240 may manage communications with the core network (e.g., via one or more wired backhaul links). For example, the network communications module 1240 may manage the transfer of data communications for client devices, such as one or more UEs 115.

Figure 13:
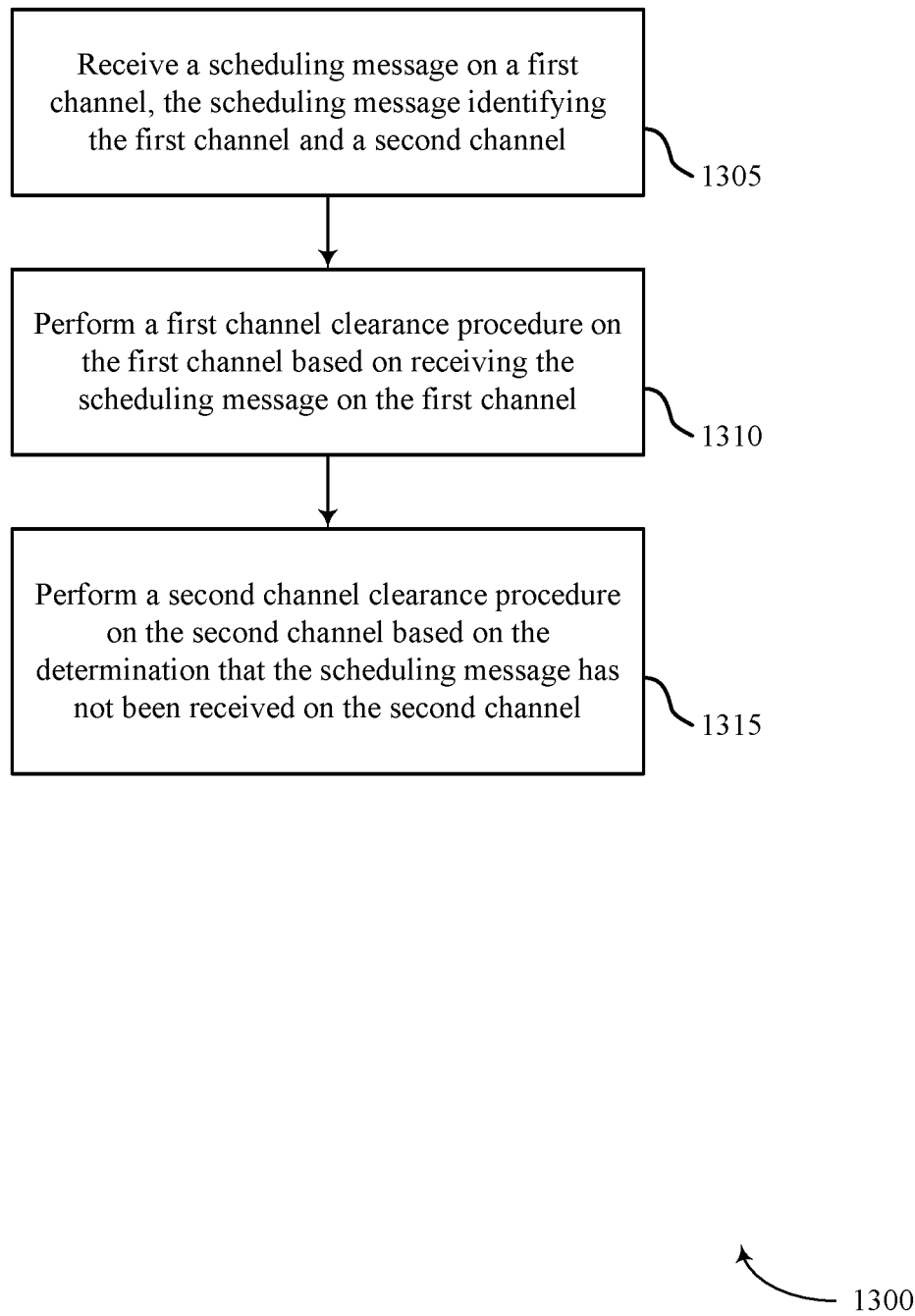
FIGS. 13 through 17 illustrate methods for opportunistic extended channel uplink grants for ECC in accordance with aspects of the present disclosure.

FIG. 13 shows a flowchart illustrating a method 1300 for opportunistic extended channel uplink grants for ECC in accordance with various aspects of the present disclosure. The operations of method 1300 may be implemented by a UE 115 or its components as described with reference to FIGS. 1 and 2. For example, the operations of method 1300 may be performed by the opportunistic grant manager as described herein. In some examples, the UE 115 may execute a set of codes to control the functional elements of the device to perform the functions described below. Additionally or alternatively, the UE 115 may perform aspects of the functions described below using special-purpose hardware.

At block 1305, the UE 115 may receive a scheduling message on a first channel, the scheduling message identifying the first channel and a second channel as described above with reference to FIGS. 2 through 4. In certain examples, the operations of block 1305 may be performed by the scheduling message component as described with reference to FIG. 7.

At block 1310, the UE 115 may perform a first channel clearance procedure on the first channel based on receiving the scheduling message on the first channel as described above with reference to FIGS. 2 through 4. In certain examples, the operations of block 1310 may be performed by the first channel clearance component as described with reference to FIG. 7.

At block 1315, the UE 115 may perform a second channel clearance procedure on the second channel based on determining that the scheduling message has not been received on the second channel as described above with reference to FIGS. 2 through 4. In certain examples, the operations of block 1315 may be performed by the second channel clearance component as described with reference to FIG. 7.

Figure 14:
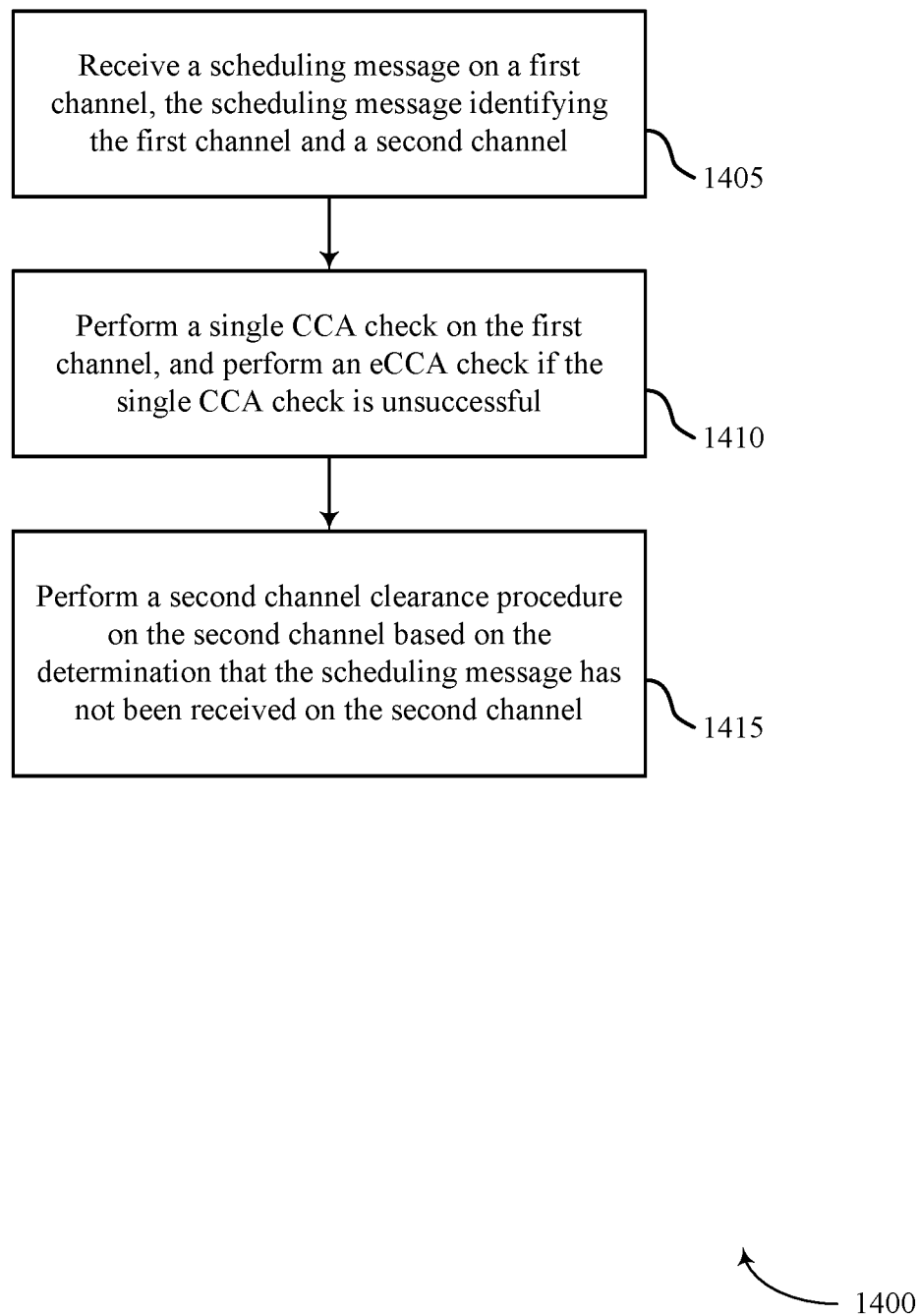

FIG. 14 shows a flowchart illustrating a method 1400 for opportunistic extended channel uplink grants for ECC in accordance with various aspects of the present disclosure. The operations of method 1400 may be implemented by a UE 115 or its components as described with reference to FIGS. 1 and 2. For example, the operations of method 1400 may be performed by the opportunistic grant manager as described herein. In some examples, the UE 115 may execute a set of codes to control the functional elements of the device to perform the functions described below. Additionally or alternatively, the UE 115 may perform aspects of the functions described below using special-purpose hardware.

At block 1405, the UE 115 may receive a scheduling message on a first channel, the scheduling message identifying the first channel and a second channel as described above with reference to FIGS. 2 through 4. In certain examples, the operations of block 1405 may be performed by the scheduling message component as described with reference to FIG. 7.

At block 1410, the UE 115 may perform a first channel clearance procedure on the first channel based on receiving the scheduling message on the first channel as described above with reference to FIGS. 2 through 4. In certain examples, the operations of block 1410 may be performed by the first channel clearance component as described with reference to FIG. 7.

At block 1415, the UE 115 may perform a second channel clearance procedure on the second channel based on determining that the scheduling message has not been received on the second channel as described above with reference to FIGS. 2 through 4. In certain examples, the operations of block 1415 may be performed by the second channel clearance component as described with reference to FIG. 7.

Figure 15:
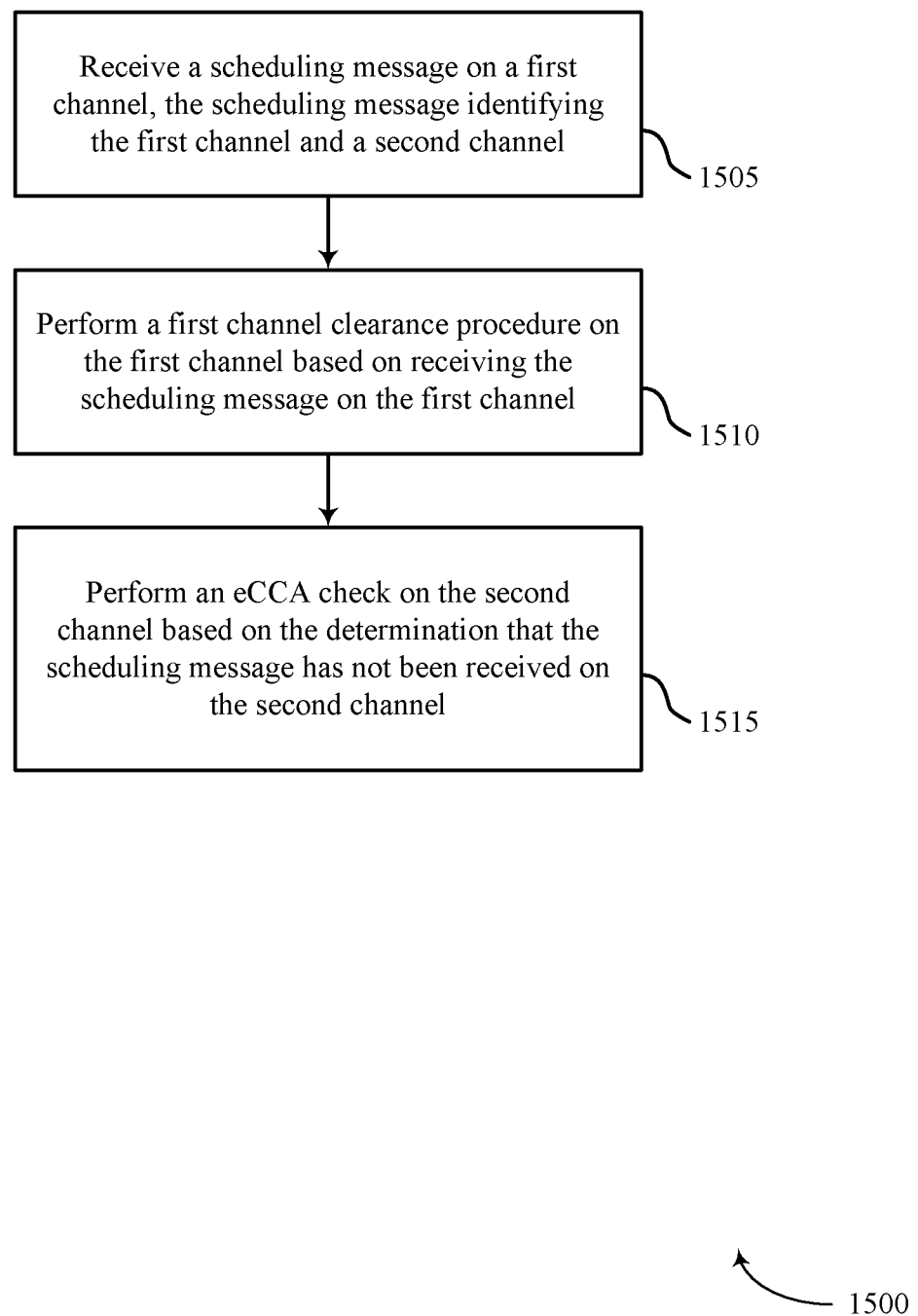

FIG. 15 shows a flowchart illustrating a method 1500 for opportunistic extended channel uplink grants for ECC in accordance with various aspects of the present disclosure. The operations of method 1500 may be implemented by a UE 115 or its components as described with reference to FIGS. 1 and 2. For example, the operations of method 1500 may be performed by the opportunistic grant manager as described herein. In some examples, the UE 115 may execute a set of codes to control the functional elements of the device to perform the functions described below. Additionally or alternatively, the UE 115 may perform aspects of the functions described below using special-purpose hardware.

At block 1505, the UE 115 may receive a scheduling message on a first channel, the scheduling message identifying the first channel and a second channel as described above with reference to FIGS. 2 through 4. In certain examples, the operations of block 1505 may be performed by the scheduling message component as described with reference to FIG. 7.

At block 1510, the UE 115 may perform a first channel clearance procedure on the first channel based on receiving the scheduling message on the first channel as described above with reference to FIGS. 2 through 4. In certain examples, the operations of block 1510 may be performed by the first channel clearance component as described with reference to FIG. 7.

At block 1515, the UE 115 may perform a second channel clearance procedure on the second channel based on determining that the scheduling message has not been received on the second channel as described above with reference to FIGS. 2 through 4. In certain examples, the operations of block 1515 may be performed by the second channel clearance component as described with reference to FIG. 7.

Figure 16:
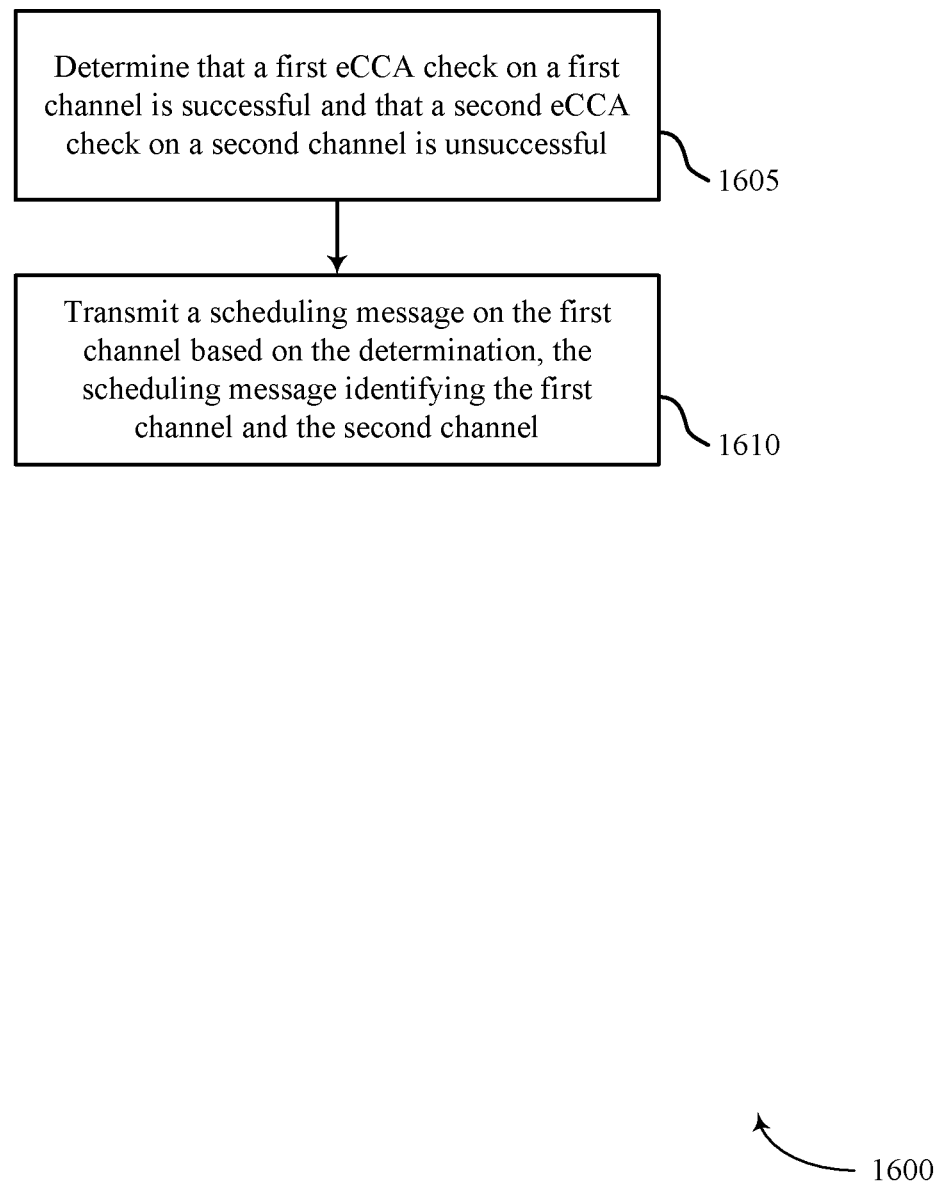

FIG. 16 shows a flowchart illustrating a method 1600 for opportunistic extended channel uplink grants for ECC in accordance with various aspects of the present disclosure. The operations of method 1600 may be implemented by a base station 105 or its components as described with reference to FIGS. 1 and 2. For example, the operations of method 1600 may be performed by the opportunistic grant manager as described herein. In some examples, the base station 105 may execute a set of codes to control the functional elements of the device to perform the functions described below. Additionally or alternatively, the base station 105 may perform aspects of the functions described below using special-purpose hardware.

At block 1605, the base station 105 may determine that a first eCCA check on a first channel is successful and that a second eCCA check on a second channel is unsuccessful as described above with reference to FIGS. 2 through 4. In certain examples, the operations of block 1605 may be performed by the eCCA component as described with reference to FIG. 11.

At block 1610, the base station 105 may transmit a scheduling message on the first channel based on the determination, the scheduling message identifying the first channel and the second channel as described above with reference to FIGS. 2 through 4. In certain examples, the operations of block 1610 may be performed by the scheduling message component as described with reference to FIG. 11.

Figure 17:
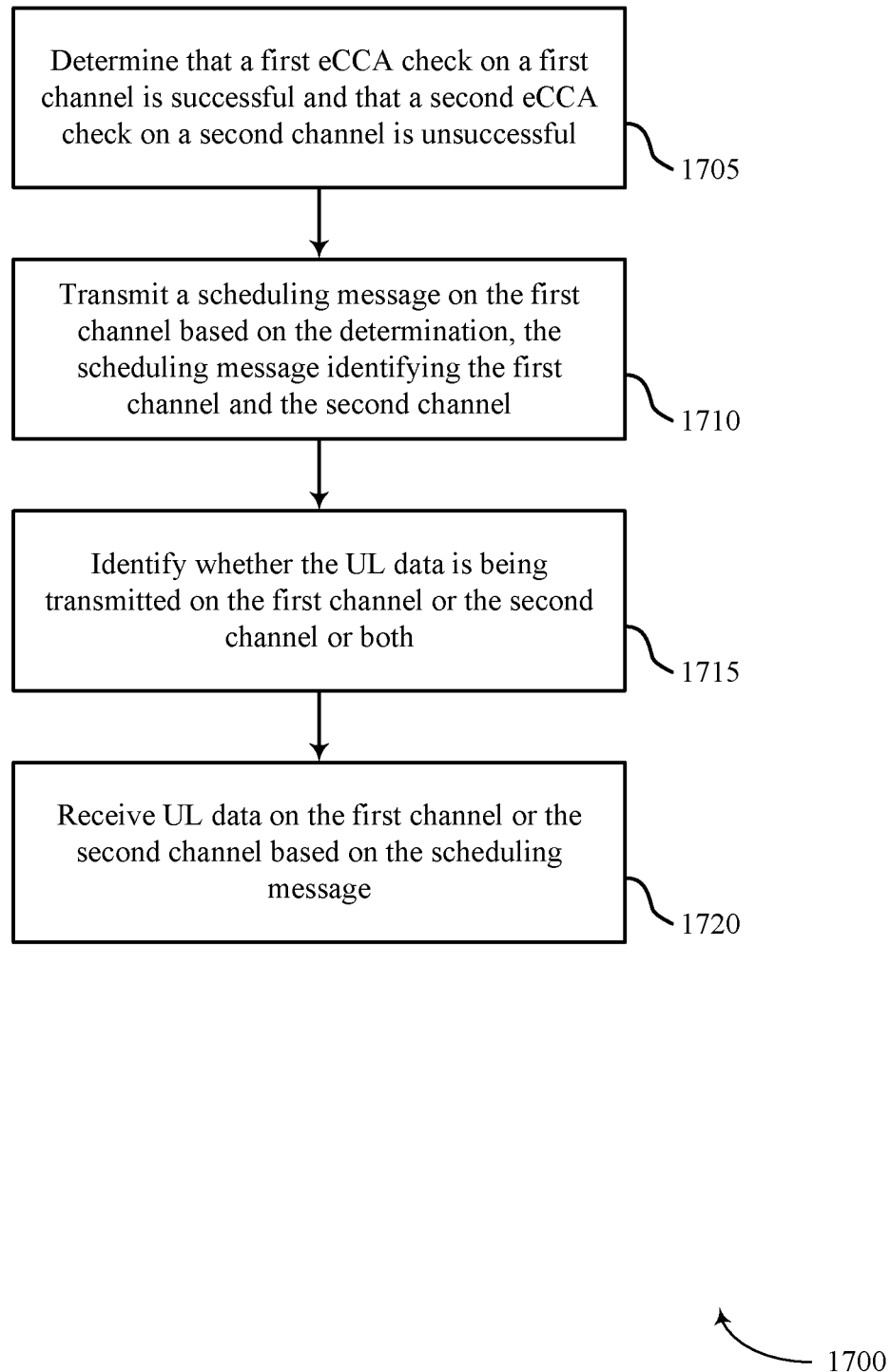

FIG. 17 shows a flowchart illustrating a method 1700 for opportunistic extended channel uplink grants for ECC in accordance with various aspects of the present disclosure. The operations of method 1700 may be implemented by a base station 105 or its components as described with reference to FIGS. 1 and 2. For example, the operations of method 1700 may be performed by the opportunistic grant manager as described herein. In some examples, the base station 105 may execute a set of codes to control the functional elements of the device to perform the functions described below. Additionally or alternatively, the base station 105 may perform aspects of the functions described below using special-purpose hardware.

At block 1705, the base station 105 may determine that a first eCCA check on a first channel is successful and that a second eCCA check on a second channel is unsuccessful as described above with reference to FIGS. 2 through 4. In certain examples, the operations of block 1705 may be performed by the eCCA component as described with reference to FIG. 11.

At block 1710, the base station 105 may transmit a scheduling message on the first channel based on the determination, the scheduling message identifying the first channel and the second channel as described above with reference to FIGS. 2 through 4. In certain examples, the operations of block 1710 may be performed by the scheduling message component as described with reference to FIG. 11.

At block 1715, the base station 105 may identify whether the UL data is being transmitted on the first channel or the second channel or both as described above with reference to FIGS. 2 through 4. In certain examples, the operations of block 1715 may be performed by the uplink data component as described with reference to FIG. 11.

At block 1720, the base station 105 may receive UL data on the first channel or the second channel based on the scheduling message as described above with reference to FIGS. 2 through 4. In certain examples, the operations of block 1720 may be performed by the uplink data component as described with reference to FIG. 11.

It should be noted that these methods describe possible implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for opportunistic extended channel uplink grants for ECC.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical (PHY) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA (FDMA), OFDMA (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11 (wireless fidelity (Wi-Fi)), IEEE 802.16 (WiMAX), IEEE 802.20, Flash-OFDM, etc. UTRA and E-UTRA are part of Universal Mobile Telecommunications system (Universal Mobile Telecommunications System (UMTS)).

3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base station of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for opportunistic extended channel uplink grants for ECC. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication comprising:
   receiving a scheduling message on a first channel, the scheduling message comprising a first uplink grant for the first channel and a second uplink grant for a second channel;
   performing a first channel clearance procedure on the first channel based at least in part on receiving the scheduling message on the first channel, wherein the first channel clearance procedure comprises measuring a first channel parameter of the first channel;
   selecting a second channel clearance procedure for the second channel different than the first channel clearance procedure based at least in part on determining that the scheduling message has not been received on the second channel, wherein the second channel clearance procedure comprises measuring a second channel parameter of the second channel and a third channel parameter of the second channel; and
   performing the second channel clearance procedure on the second channel different than the first channel clearance procedure based at least in part on selecting the second channel clearance procedure.

2. The method of claim 1, wherein performing the first channel clearance procedure comprises:
   performing a single clear channel assessment (CCA) check, and performing an extended CCA (eCCA) check if the single CCA check is unsuccessful.

3. The method of claim 2, wherein performing the single CCA check comprises:
   determining whether the first channel is clear based at least in part on a single CCA.

4. The method of claim 2, further comprising:
   transmitting uplink (UL) data on the first channel based at least in part on the first channel clearance procedure.

5. The method of claim 1, wherein performing the second channel clearance procedure comprises:
   performing an extended clear channel assessment (eCCA) check.

6. The method of claim 5, wherein performing the second channel clearance procedure comprises:
determining that a single clear channel assessment (CCA) check is not sufficient to gain access to the second channel.

7. The method of claim 5, further comprising:
   transmitting uplink (UL) data on the second channel based at least in part on the second channel clearance procedure, wherein the transmitted UL data comprises an indication of whether the first channel, the second channel or both are being used.

8. The method of claim 1, wherein a first modulation and coding scheme (MCS) of the first uplink grant is different from a second MCS of the second uplink grant.

9. An apparatus for wireless communication, comprising:
   a processor;
   memory in electronic communication with the processor; and
   instructions stored in the memory and operable, when executed by the processor, to cause the apparatus to:
      receive a scheduling message on a first channel, the scheduling message comprising a first uplink grant for the first channel and a second uplink grant for a second channel;
      perform a first channel clearance procedure on the first channel based at least in part on receiving the scheduling message on the first channel, wherein the first channel clearance procedure comprises measuring a first channel parameter of the first channel;
      select a second channel clearance procedure for the second channel different than the first channel clearance procedure based at least in part on determining that the scheduling message has not been received on the second channel, wherein the second channel clearance procedure comprises measuring a second channel parameter of the second channel and a third channel parameter of the second channel; and
      perform the second channel clearance procedure on the second channel different than the first channel clearance procedure based at least in part on selecting the second channel clearance procedure.

10. The apparatus of claim 9, wherein performing the first channel clearance procedure comprises:
    performing a single clear channel assessment (CCA) check, and performing an extended CCA (eCCA) check if the single CCA check is unsuccessful.

11. The apparatus of claim 10, wherein perform the single CCA check comprises:
    determining whether the first channel is clear based at least in part on a single CCA.

12. The apparatus of claim 10, wherein the instructions are operable to cause the processor to:
    transmit uplink (UL) data on the first channel based at least in part on the first channel clearance procedure.

13. The apparatus of claim 9, wherein performing the second channel clearance procedure comprises:
    performing an extended clear channel assessment (eCCA) check.

14. The apparatus of claim 13, wherein performing the second channel clearance procedure comprises:
    determining that a single clear channel assessment (CCA) check is not sufficient to gain access to the second channel.

15. The apparatus of claim 13, wherein the instructions are operable to cause the processor to:
    transmit uplink (UL) data on the second channel based at least in part on the second channel clearance procedure, wherein the transmitted UL data comprises an indication of whether the first channel, the second channel or both are being used.

16. The apparatus of claim 9, wherein a first modulation and coding scheme (MCS) of the first uplink grant is different from a second MCS of the second uplink grant.

* * * * *